(12) United States Patent
Ohwatari et al.

(10) Patent No.: US 9,357,504 B2
(45) Date of Patent: May 31, 2016

(54) RADIO COMMUNICATION SYSTEM AND RADIO BASE STATION

(71) Applicant: NTT DOCOMO, INC., Chiyoda-ku (JP)

(72) Inventors: Yusuke Ohwatari, Chiyoda-ku (JP); Akihito Morimoto, Chiyoda-ku (JP); Yukihiko Okumura, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 14/405,261

(22) PCT Filed: May 21, 2013

(86) PCT No.: PCT/JP2013/064109
§ 371 (c)(1),
(2) Date: Dec. 3, 2014

(87) PCT Pub. No.: WO2014/017155
PCT Pub. Date: Jan. 30, 2014

(65) Prior Publication Data
US 2015/0146638 A1    May 28, 2015

(30) Foreign Application Priority Data
Jul. 27, 2012  (JP) .................................. 2012-166566

(51) Int. Cl.
*H04W 52/24* (2009.01)
*H04W 16/14* (2009.01)
(Continued)

(52) U.S. Cl.
CPC ............ *H04W 52/243* (2013.01); *H04W 16/08* (2013.01); *H04W 16/14* (2013.01);
(Continued)

(58) Field of Classification Search
CPC ... H04W 16/32; H04W 52/244; H04W 48/16; H04W 52/34; H04W 72/0493; H04W 16/08; H04W 16/10; H04W 16/14; H04W 24/02; H04W 52/04; H04W 52/38; H04W 52/40; H04W 52/143; H04W 52/243; H04W 52/24
See application file for complete search history.

(56) References Cited

U.S. PATENT DOCUMENTS 8,804,586 B2 * 8/2014 Fong ..................... H04L 5/0053
370/311
8,989,752 B2 * 3/2015 Zhao ..................... H04W 16/10
370/328

(Continued)

FOREIGN PATENT DOCUMENTS

JP          2000-511370 A       8/2000
WO          97/45968 A1        12/1997

OTHER PUBLICATIONS

International Search Report issued Jun. 18, 2013 in PCT/JP2013/064109 filed May 21, 2013.
(Continued)

*Primary Examiner* — Ahmed Elallam
(74) *Attorney, Agent, or Firm* — Oblon, McClelland, Maier & Neustadt, L.L.P.

(57) ABSTRACT

In a radio communication system in which a high-power base station and a low-power base station collaborate for inter-cell interference control, the downlink transmission power at the high-power base station is suitably controlled. The high-power base station executes wireless transmission to the user terminals using resources that are the same as resources used by the low-power radio base station. A transmission power controller of the radio base station uses a first downlink transmission power at first resources and uses a lower second downlink transmission power at second resources. The transmission power controller adjusts the second downlink transmission power in accordance with the number of user terminals capable of executing interference rejection combining, the downlink traffic amount for user terminals capable of executing interference rejection combining, or the number of downlink resource blocks allocated to user terminals capable of executing interference rejection combining.

11 Claims, 11 Drawing Sheets

(51) Int. Cl.
*H04W 24/02* (2009.01)
*H04W 16/08* (2009.01)
*H04W 16/32* (2009.01)
*H04W 52/14* (2009.01)
*H04W 52/38* (2009.01)
*H04W 52/40* (2009.01)

(52) U.S. Cl.
CPC .............. *H04W 16/32* (2013.01); *H04W 24/02* (2013.01); *H04W 52/143* (2013.01); *H04W 52/244* (2013.01); *H04W 52/38* (2013.01); *H04W 52/40* (2013.01)

(56) References Cited

U.S. PATENT DOCUMENTS

| | | | | |
|---|---|---|---|---|
| 9,185,710 B2* | 11/2015 | Morimoto | ............. | H04W 16/08 |
| 2012/0149362 A1* | 6/2012 | Tooher | .................. | H04W 24/10 |
| | | | | 455/423 |
| 2012/0188884 A1* | 7/2012 | Simonsson | ....... | H04W 36/0083 |
| | | | | 370/252 |
| 2012/0282864 A1* | 11/2012 | Dimou | .................. | H04W 36/22 |
| | | | | 455/67.14 |
| 2013/0121191 A1* | 5/2013 | Song | .................. | H04J 11/0056 |
| | | | | 370/252 |
| 2013/0242885 A1* | 9/2013 | Zhu | ........................ | H04L 5/1469 |
| | | | | 370/329 |
| 2014/0256336 A1* | 9/2014 | Manssour | ............. | H04L 1/0026 |
| | | | | 455/450 |
| 2015/0117341 A1* | 4/2015 | Ohwatari | ............. | H04L 5/0032 |
| | | | | 370/329 |

OTHER PUBLICATIONS

"On advanced UE MMSE receiver modelling in system simulations", Nokia, Nokia Siemens Networks, 3GPP TSG RAN WG1 Meeting #64, vol. R1-111031, Feb. 21-25, 2011, 10 Pages.

Lars Thiele, et al, "On the Value of Synchronous Downlink MIMO-OFDMA Systems with Linear Equalizers", IEEE ISWCS, 2008, pp. 428-432.

"Enhanced performance requirement for LTE User Equipment (UE) (Release 11)" 3GPP TR 36.829, vol. 11.1.0, Dec. 2012, 114 Pages.

Raphael Visoz, et al., "Binary Versus Symbolic Performance Prediction Methods for Iterative MMSE-IC Multiuser MIMO Joint Decoding", Proc. IEEE SPAWC, Jun. 2009, pp. 131-135.

"Evolved Universal Terrestrial Radio Access (E-UTRA); Further advancements for E-UTRA physical layer aspects (Release 9)" 3GPP TR 36.814, vol. 9.0.0, Mar. 2010, 104 Pages.

"Performance of eICIC with Control Channel Coverage Limitation" NTT DOCOMO, 3GPP TSG RAN WG1 Meeting #61, vol. R1-103264, May 10-14, 2010, 8 Pages.

"Performance Evaluation of Non-zero Transmit Power ABS for FeICIC," NTT DOCOMO, 3GPP TSG RAN WG1 Meeting #68, vol. R1-120401, Feb. 6-10, 2012, 8 Pages.

Extended European Search Report issued Dec. 8, 2015 in Patent Application No. 13823597.3.

* cited by examiner

RADIO COMMUNICATION SYSTEM AND RADIO BASE STATION

FIELD OF THE INVENTION

The present invention relates to a radio communication system and to a radio base station.

BACKGROUND ART

In LTE (Long Term Evolution) Advanced in the 3GPP (Third Generation Partnership Project), a reception technique for user terminals called Interference Rejection Combining is under consideration. The Interference Rejection Combining (IRC) is a technique for downlink communication, in which a user terminal gives weights to signals obtained by respective reception antennas so as to reduce interference by interfering radio wave beams from interfering base stations to the desired radio wave beam from the visited base station (desired base station). The IRC improves the reception quality of desired signals carried over the desired radio wave beam, in particular, when a user terminal 4 is located, as shown in FIG. 1, near the boundary of a visited cell 1a (cell of the desired base station 1) and receives an interfering radio wave beam from another base station 2 (interfering base station) next to the desired base station 1. In FIG. 1, reference numeral 2a denotes the cell of the interfering base station 2. FIG. 1 also shows a schematic shape of a beam 1b generated by the desired base station 1 and a schematic shape of a beam 2b generated by the interfering base station 2. A part of the beam 2b generated by the interfering base station 2, i.e., a part of a beam for downlink channels for other user terminals (e.g., a user terminal 5) causes an interference signal 2c for the user terminal 4.

IRC is described, for example, in Patent Document 1, Non-Patent Document 1, Non-Patent Document 2, and Non-Patent Document 3. In IRC, the user terminal gives weights to each of multiple signals obtained by multiple reception antennas so as to suppress the interference from the interfering radio wave beam to the desired radio wave beam, and the user terminal uses the reception weights to separate the signal destined for the user terminal from signals destined for other user terminals from among the multiple signals derived from radio waves received by the multiple reception antennas. As a type of the IRC, a technique called Successive Interference Cancellation (SIC) has been proposed (e.g., Non-Patent Document 4). In the SIC, the user terminal obtains the desired signal for the user terminal by demodulating an interference signal, which is additionally decoded in some cases, and subtracting the interference signal from the received signal successively.

On the other hand, in recent years, a heterogeneous network (HetNet) has been proposed in which plural types of radio base stations (macro base stations, pico base stations, femto base stations, remote radio heads, etc.) varying in transmission power (transmission capability) are deployed in a multi-layered way (e.g., Non-Patent Document 5).

In the heterogeneous network, base stations having a higher transmission power (transmission capability), e.g., macro base stations, are likely to be selected as the radio access points for user terminals at the stage of cell search or handover, in comparison with other base stations having a lower transmission power (transmission capability), e.g., pico base stations. Accordingly, it is assumed that connections of user terminals are concentrated at base stations with higher transmission power, and thus, there will be a tendency for excessive communication load at base stations with higher transmission power.

Accordingly, a technique called cell range expansion has been proposed. The cell range expansion is a technique to give an offset value (bias value) to the reception quality or reception power from the low-power base station, the reception quality or the reception power being an index for cell selection by the user terminal. The reception quality or the reception power from the low-power base station to which an offset value has been added (or added in the unit of dB) is compared with the reception quality or the reception power from the macro base station. As a result, the reception quality or the reception power from the low-power base station is likely to become better than the reception quality or the reception power from the macro base station. Consequently, since user terminals select to connect to the low-power base station rather than the macro base station, the cell range of the low-power base station is expanded, and it is likely that the communication load of the macro base station will be reduced.

However, when the cell range of the low-power base station is expanded by the cell range expansion (CRE), the user terminal located at the edge of the cell of the low-power base station may be subject to high levels of interference by radio waves from the neighboring high-power base station. Therefore, a technique called enhanced inter-cell interference coordination or enhanced inter-cell interference control, which is an extension of the inter-cell interference coordination or inter-cell interference control, has been proposed. This technique is abbreviated as "eICIC". The eICIC is described, for example, in Non-patent Document 6.

The eICIC is classified into a frequency domain-based eICIC and a time domain-based eICIC. In either type, eICIC is a technique to limit resources available for a macro base station in order to prevent or minimize interference at user terminals connected with the low-power base station.

In the frequency domain-based eICIC, multiple frequency bands are prepared. First frequency bands are used for downlink transmission from the macro base station to user terminals connected with the macro base station and for downlink transmission from the low-power base stations to user terminals at the centers of the cells of the low-power base stations (e.g., user terminals connected with the low-power base stations without CRE). Second frequency bands are used for downlink transmission from the low-power base station to user terminals at the edges of the cells of the low-power base stations (e.g., user terminals connected with the low-power base stations by virtue of CRE), and are not used for downlink transmission from the macro base station. Thus, it is expected to prevent user terminals at the edges of the cells of the low-power base stations from being interfered with by radio waves from the macro base station.

In the time domain-based eICIC, the macro base station and the low-power base station use the same frequency band, but different time units (for example, subframes) are used for different purposes. The low-power base station is capable of doing continuous downlink transmission. However, the macro base station can perform downlink transmission only intermittently. As a result, a period during which only the low-power base stations perform downlink transmission (protected subframe) and a period during which the macro base station and the low-power base stations perform downlink transmission (non-protected subframe) are repeated. The non-protected subframes are used for downlink transmission from the macro base station to user terminals connected with the macro base station and for downlink transmission from the low-power base stations to user terminals at the centers of the cells of the low-power base stations (e.g., user terminals connected with the low-power base stations without CRE). The protected subframes are used for downlink transmission from the low-power base station to user terminals at the edges of the cells of the low-power base stations (e.g., user terminals connected with the low-power base stations by virtue of CRE). Thus, it is anticipated that it will be possible to prevent user terminals at the edges of the cells of the low-power base stations from interference by radio waves from the macro base station.

Furthermore, another eICIC technique has been proposed in which transmission from the high-power base station is permitted but the transmission power is limited to be low at the resources at which the low-power base stations execute transmission for user terminals at the edges of the cells of the low-power base stations (Non-patent Document 7). Specifically, in the frequency domain-based eICIC, even the above-mentioned second frequency bands are used for downlink transmission from the macro base station, but the transmission power is limited to be low, so that interference at user terminals at the edges of the cells of the low-power base stations is restricted. In the time domain-based eICIC, even the protected subframes are used for downlink transmission from the macro base station, but the transmission power is limited to be low, so that interference at user terminals at the edges of the cells of the low-power base stations is restricted.

RELATED ART DOCUMENTS

Patent Documents

Patent Document 1: JP-A-2000-511370 Non-patent Documents
Non-patent Document 1: R1-111031, 3GPP TSG RAN WG1 Meeting #64, Taipei, Taiwan, 21-25 Feb. 2011, Agenda item: 6.3.1.3, Source: Nokia, Nokia Siemens Networks, Title: "On advanced UE MMSE receiver modelling in system simulations", Document for: Discussion and Decision
Non-patent Document 2: Lars Thiele at al, "On the Value of Synchronous Downlink MIMO-OFDMA Systems with Linear Equalizers", Fraunhofer Institute for Telecommunications, Heinrich-Hertz-Institut Einsteinufer 37, 10587 Berlin, Germany
Non-patent Document 3: 3rd Generation Partnership Project; Technical Specification Group Radio Access Network; Enhanced performance requirement for LTE User Equipment (UE) (Release 11); 3GPP TR 36.829 V11.1.0 (2012-12)
Non-patent Document 4: Raphael Visoz at al, "Binary Versus Symbolic Performance Prediction Methods For Iterative MMSE-IC Multiuser MIMO Joint Decoding", in Proc. IEEE SPAWC, June 2009
Non-patent Document 5: 3rd Generation Partnership Project; Technical Specification Group Radio Access Network; Evolved Universal Terrestrial Radio Access (E-UTRA); Further advancements for E-UTRA physical layer aspects (Release 9); 3GPP TR 36.814 V9.0.0 (2010-03); Section 9A, Heterogeneous Deployments
Non-patent Document 6: R1-103264, 3GPP TSG RAN WG1 Meeting #61, Montreal, Canada, May 10-14, 2010, Source: NTT DOCOMO, Title: "Performance of eICIC with Control Channel Coverage Limitation", Agenda Item: 6.8, Document for: Discussion and Decision
Non-patent Document 7: R1-120401, 3GPP TSG RAN WG1 Meeting #68, Dresden, Germany, 6-10 Feb. 2012, Source: NTT DOCOMO, Title: Performance Evaluation of Non-zero Transmit Power ABS for FeICIC, Agenda Item: 7.3.1, Document for: Discussion and Decision

SUMMARY OF THE INVENTION

Let us assume that user terminals performing the IRC in a radio communication system employing the eICIC are used. In this case, it is normally expected that the reception qualities of the user terminals would be progressively improved by interference restriction by the eICIC and by the interference suppression effect of the user terminals.

However, it is not always necessary for radio base stations to cooperatively conduct interference countermeasures for user terminals that originally have high interference suppression capability by the IRC and are capable of securing good reception quality. In the eICIC in which the transmission power of the high-power base station is limited to be low, the efficiency of downlink transmission is reduced at the high-power base station due to the reduction of the transmission power. Specific reasons for the reduction of transmission efficiency are, for example, signal losses, disablement of use of high code rates, and disablement of use of modulation schemes with high modulation levels due to the low power. On the other hand, for user terminals incapable of performing interference suppression due to not carrying out the IRC, it is desirable to execute the eICIC.

Accordingly, the present invention provides a technology, in a radio communication system, in which user terminals with and without interference suppression capability are used together, and in which a high-power radio base station and a low-power radio base station collaborate for inter-cell interference control, for suitably controlling the downlink transmission power at the high-power base station.

According to the present invention, a radio communication system includes: at least one high-power radio base station that forms a first cell and communicates with multiple user terminals; and at least one low-power radio base station connected with the high-power radio base station and communicates with multiple user terminals, the low-power radio base station having a maximum transmission power less than a maximum transmission power of the high-power radio base station and forming a second cell within the first cell, the second cell being smaller than the first cell. The high-power radio base station is configured to execute wireless transmission to the user terminals using resources that are the same as resources used by the low-power radio base station, and is configured to collaborate with the low-power radio base station for inter-cell interference control. The high-power radio base station includes: a radio communicator configured to execute wireless communication with user terminals connected with the high-power radio base station; and a transmission power controller configured to control downlink transmission power used by the radio communicator for transmission to the user terminals. The transmission power controller is configured to cause the radio communicator to operate at a first downlink transmission power at first resources among said resources, and to cause the radio communicator to operate at a second downlink transmission power that is lower than the first downlink transmission power at second resources among said resources. The transmission power controller is configured to adjust the second downlink transmission power in accordance with a proportion of the number of user terminals capable of executing interference rejection combining from among the total number of user terminals connected with at least one of the high-power radio base station and the low-power radio base station, a proportion of the downlink traffic amount for user terminals capable of executing interference rejection combining from among the total downlink traffic amount for user terminals connected with at least one of the high-power radio base station and the low-power radio base station, or the number of downlink resource blocks allocated to user terminals connected with at least one of the high-power radio base station and the low-power radio base station and being capable of executing interference rejection combining.

The transmission power controller of the high-power radio base station may adjust the second downlink transmission power in accordance with a proportion of the number of user terminals capable of executing interference rejection combining from among the total number of user terminals connected with the low-power radio base station, a proportion of the downlink traffic amount for user terminals capable of executing interference rejection combining from among the total downlink traffic amount for user terminals connected with the low-power radio base station, or the number of downlink resource blocks allocated to user terminals connected with the low-power radio base station and being capable of executing interference rejection combining.

The transmission power controller of the high-power radio base station may adjust the second downlink transmission power in accordance with a proportion of the number of user terminals capable of executing interference rejection combining from among the total number of user terminals connected with the high-power radio base station, a proportion of the downlink traffic amount for user terminals capable of executing interference rejection combining from among the total downlink traffic amount for user terminals connected with the high-power radio base station, or the number of downlink resource blocks allocated to user terminals connected with the high-power radio base station and being capable of executing interference rejection combining.

According to the present invention, a radio base station communicates with user terminals and is configured to execute wireless transmission to the user terminals using resources that are the same as resources used by a low-power radio base station having a maximum transmission power less than a maximum transmission power of the radio base station and forming a second cell within a first cell formed by the radio base station. The radio base station is configured to collaborate with the low-power radio base station for inter-cell interference control. The radio base station includes: a radio communicator configured to execute wireless communication with user terminals connected with the radio base station; and a transmission power controller configured to control downlink transmission power used by the radio communicator for transmission to the user terminals. The transmission power controller is configured to cause the radio communicator to operate at a first downlink transmission power at first resources among said resources, and to cause the radio communicator to operate at a second downlink transmission power that is lower than the first downlink transmission power at second resources among said resources. The transmission power controller is configured to adjust the second downlink transmission power in accordance with a proportion of the number of user terminals capable of executing interference rejection combining from among the total number of user terminals connected with at least one of the radio base station and the low-power radio base station, a proportion of the downlink traffic amount for user terminals capable of executing interference rejection combining from among the total downlink traffic amount for user terminals connected with at least one of the radio base station and the low-power radio base station, or the number of downlink resource blocks allocated to user terminals connected with at least one of the radio base station and the low-power radio base station and being capable of executing interference rejection combining.

Effect of the Invention

In the present invention, the high-power base station (for example, macro base station) can suitably control the second downlink transmission power (lower downlink transmission power) for the second resources in accordance with a proportion of the number of user terminals capable of executing interference rejection combining from among the total number of multiple user terminals, a proportion of the downlink traffic amount for user terminals capable of executing interference rejection combining from among the total downlink traffic amount for user terminals, or the number of downlink resource blocks allocated to user terminals capable of executing interference rejection combining. In a case in which there are many user terminals capable of executing interference rejection combining, in a case in which there is a large amount of downlink traffic for such user terminals, or in a case in which there are many downlink resource blocks for such user terminals, even if the downlink transmission power of the high-power base station is set to a high level, many user terminals (many user terminals capable of executing interference rejection combining) located in the cell of the low-power base station can reduce interference from the high-power base station. In this situation, it is suitable for the second downlink transmission power (lower downlink transmission power) to be set to a high level. On the other hand, in a case in which there are few user terminals capable of executing interference rejection combining, in a case in which there is a lower amount of downlink traffic for such user terminals, or in a case in which there are few downlink resource blocks for such user terminals, if the downlink transmission power of the high-power base station is set to a high level, reception qualities at many user terminals (many user terminals incapable of executing interference rejection combining) located in the cell of the low-power base station are likely to be lowered for interference from the high-power base station. In this situation, it is suitable for the second downlink transmission power (lower downlink transmission power) to be set to a low level at the high-power base station. Accordingly, it is possible to suitably control the downlink transmission power at the high-power base station in a radio communication system, in which the high-power radio base station and the low-power radio base station collaborate for inter-cell interference control.

DESCRIPTION OF EMBODIMENTS

With reference to the accompanying drawings, various embodiments of the present invention will be described hereinafter.

First Embodiment

Figure 1:
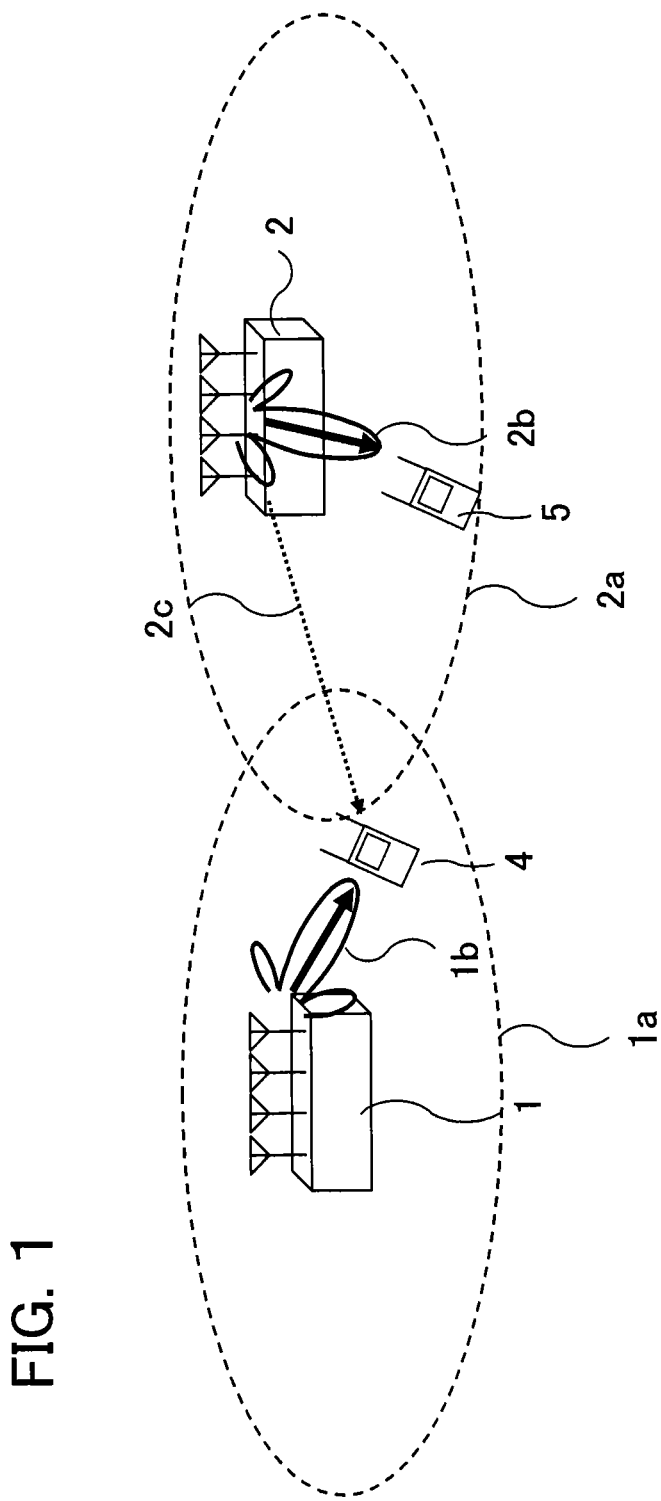
FIG. 1 is a diagram showing a mobile communication terminal receiving an interfering beam from an interfering base station.
Figure 2:
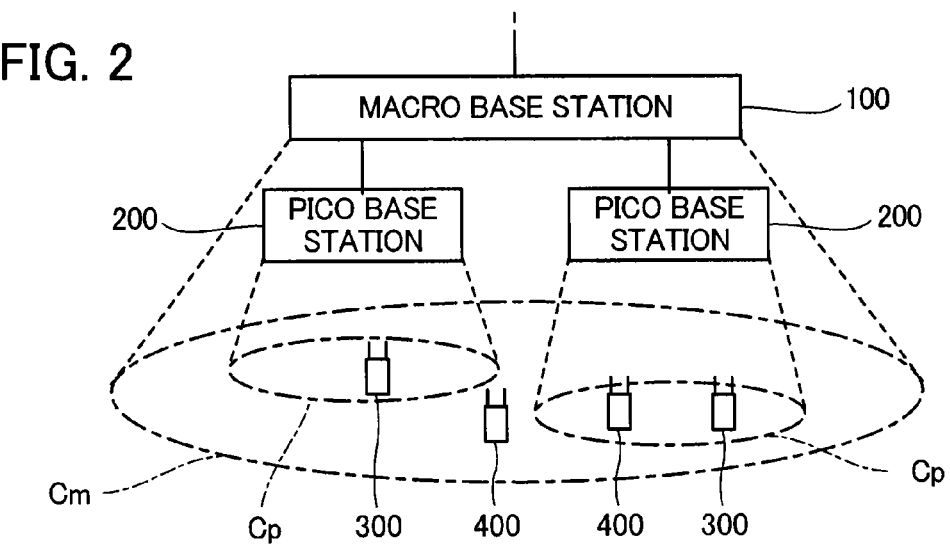
FIG. 2 is a block diagram showing a radio communication system according to a first embodiment of the present invention.

FIG. 2 is schematic view showing a radio communication system according to a first embodiment of the present invention. The radio communication system includes a macro base station (macro eNodeB (evolved Node B)) 100 and pico base stations (pico eNodeBs) 200.

The macro base station 100 and the pico base stations 200 in the radio communication system conduct radio communication with user terminals 300 and 400 in compliance with a predetermined radio access technology, e.g., LTE (Long Term Evolution) in 3GPP (Third Generation Partnership Project). In this embodiment, the radio communication system operates in compliance with the LTE, but it is not intended to limit the technical scope of the present invention. The present invention can be used with other radio access technologies, such as, for example, WiMAX (Worldwide Interoperability for Microwave Access) stipulated in IEEE 802.16 with necessary design modifications.

The macro base station (high-power radio base station) 100 is connected with the pico base stations (low-power radio base stations) 200 via radio or cable. The macro base station 100 forms a macro cell (first cell) Cm, whereas each pico base station 200 forms a pico-cell Cp (second cell). Each pico-cell Cp is a cell formed within the macro cell Cm formed by the macro base station 100 to which the pico base station 200 that forms the pico-cell Cp is connected. Multiple pico-cell Cp may be formed within a single macro cell Cm.

Each of the base stations (the macro base station 100 and the pico base stations 200) can perform radio communication with user terminals (UEs, user equipments) 300 and 400 visiting the cell of the base station itself. In other words, each user terminal 300 or 400 can perform radio communication with one or more base stations (the macro base station 100 and one of the pico base stations 200, if any) corresponding to one or more cells C (the macro cell Cm and one of the pico-cells Cp if any) at which the user terminal 300 or 400 itself is visiting.

Radio transmission capability (maximum transmission power, average transmission power, etc.) of the macro base station 100 is higher than that of pico base stations 200. Therefore, the macro base station 100 can perform wireless communication with a more distant user terminal. Consequently, the macro cell Cm is larger in area than pico-cells Cp. For example, the radius of the macro cell Cm is from several hundred meters to several tens of kilometers, whereas the radius of the pico-cell Cp is from several meters to several tens of meters.

As will be understood from the above description, the macro base station 100 and the pico base station 200 in the radio communication system constitute a heterogeneous network in which multiple types of radio base stations having different transmission powers (transmission capabilities) are deployed in a multi-layered way.

Since the pico-cells Cp are formed in a multi-layered way (i.e., overlaid) inside the macro cell Cm, when the user terminal is visiting the pico-cell Cp, it will be understood that the user terminal can perform radio communication with at least one of the pico base stations 200 defining the pico-cells Cp and the macro base station 100 defining the macro cell Cm that includes the pico-cells Cp.

The scheme for radio communication between each base station and each user terminal may be freely chosen. For example, OFDMA (Orthogonal Frequency Division Multiple Access) may be adopted for downlink, whereas SC-FDMA (Single-Carrier Frequency Division Multiple Access) may be adopted for uplink.

The user terminals 300 and 400 are classified into IRC terminals 300, which are capable of executing the interference rejection combining (IRC), and non-IRC terminals 400, which are incapable of the interference rejection combining.

Figure 3:
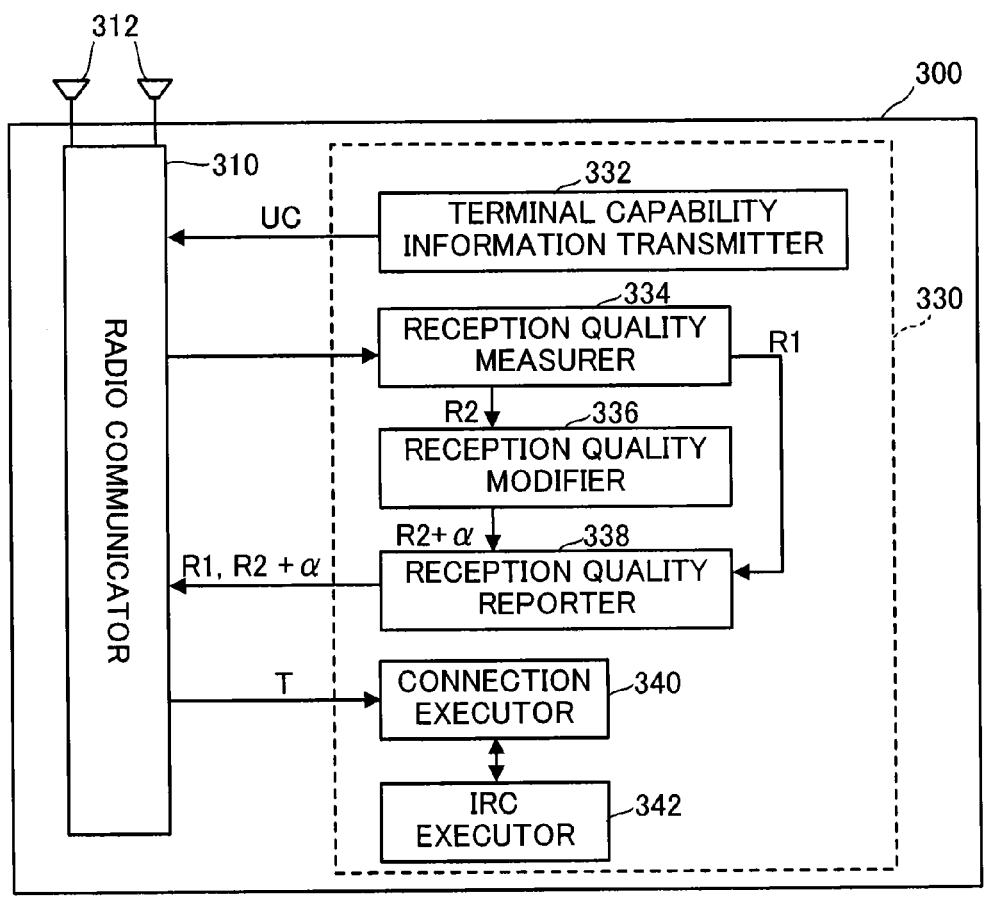
FIG. 3 is a block diagram showing the configuration of an IRC terminal according to the first embodiment of the present invention.

FIG. 3 is a block diagram showing the structure of the IRC terminal 300 according to the first embodiment of the present invention. The IRC terminal 300 includes a radio communicator 310 and a controller 330. In FIG. 3, the illustration of an output device for outputting voice, a picture, etc., input devices for receiving instructions from a user, etc., are omitted.

The radio communicator 310 is an element for executing radio communication with radio base stations (the macro base station 100 and the pico base stations 200), and includes multiple transceiving antennas 312, a reception circuit (not shown) for receiving radio waves from radio base stations to convert into electrical signals, and a transmission circuit (not shown) for converting electrical signals such as audio signals into radio waves for transmission. The radio communicator 310 receives access point cell information T from the macro base station 100 forming the macro cell Cm in which the IRC terminal 300 is located or from the pico base station 200 forming the pico cell Cp in which the IRC terminal 300 is located. The access point cell information T is information indicating the radio base station (macro base station 100 or pico base station 200) to which the user terminal 300 should be connected. In accordance with the access cell information T, the user terminal 300 communicates with the access point radio base station.

The radio communicator 310 reports terminal capability information (UE Capability Information) UC and a reception power measurement result to the radio base station (the macro base station 100 or the pico base station 200) to which the user terminal is connected (described below in detail). The terminal capability information UC includes information indicating whether the user terminal itself is capable of executing the interference rejection combining, i.e., information indicating whether the user terminal is an IRC terminal 300 or a non-IRC terminal 400. For the IRC terminal 300, the terminal capability information UC indicates that the transmission source (user terminal) is an IRC terminal.

The controller 330 includes a terminal capability information transmitter 332, a reception quality measurer 334, a reception quality modifier 336, a reception quality reporter 338, a connection executor 340, and an IRC executor 342 as elements. The connection executor 340 and the IRC executor 342 can suppress interference power in downlink communication by executing the above-mentioned interference rejection combining in coordination with the radio communicator 310. The details of other operations of the controller 330 will be described below.

The controller 330 and the terminal capability information transmitter 332, the reception quality measurer 334, the reception quality modifier 336, the reception quality reporter 338, the connection executor 340, and the IRC executor 342 included in the controller 330 are functional blocks accomplished by the fact that a CPU (central processing unit, not shown) in the IRC terminal 300 executes a computer program stored in a memory (not shown) and operates in accordance with the computer program.

Figure 4:
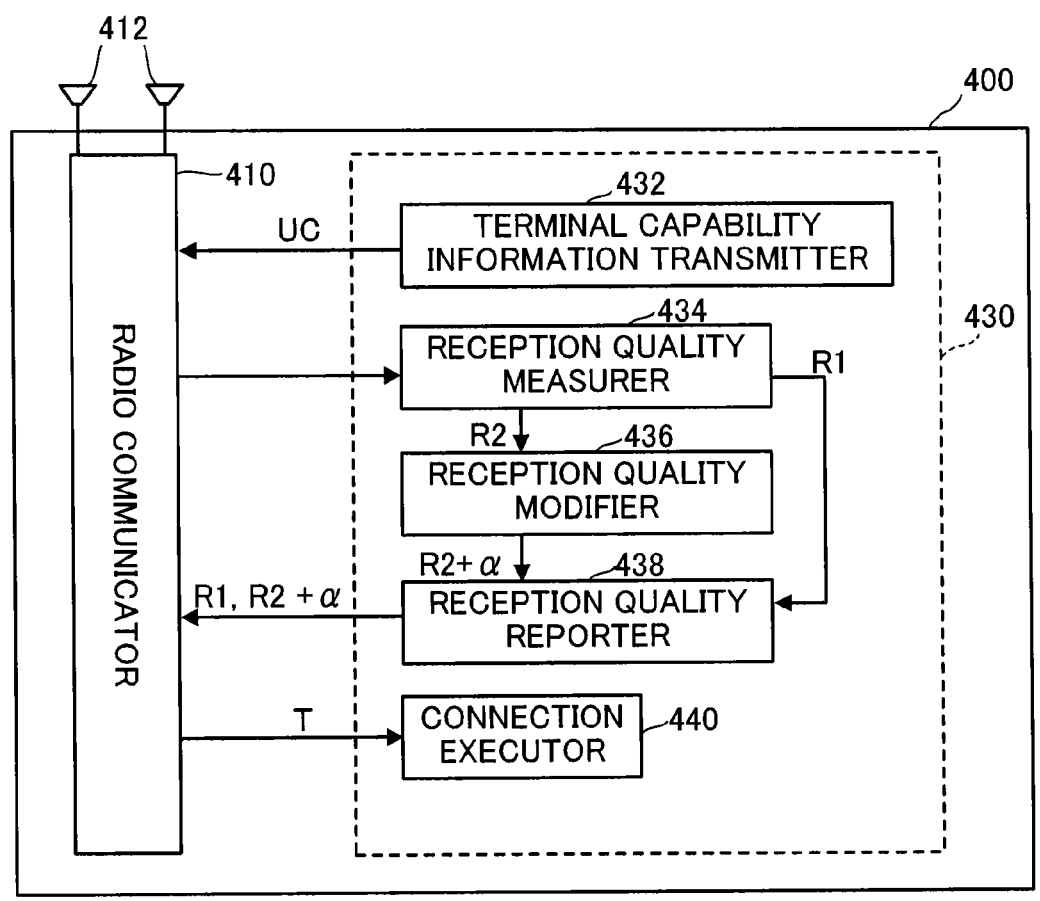
FIG. 4 is a block diagram showing the configuration of a non-IRC terminal according to the first embodiment of the present invention.

FIG. 4 is a block diagram showing the structure of the non-IRC terminal 400 according to the first embodiment of the present invention. Like the IRC terminal 300, the non-IRC terminal 400 includes a radio communicator 410 and a controller 430. In FIG. 4, the illustration of an output device outputting a voice, a picture, etc., an input device for accepting instructions from a user, etc., are omitted. In summary, the non-IRC terminal 400 is different from the IRC terminal 300 as to whether the IRC executor 342 is provided (i.e., whether it is capable of executing interference rejection combining), but it is the same for other structural elements.

The radio communicator 410 is an element configured to perform radio communication with radio base stations (the macro base station 100 and the pico base stations 200) and includes at least one transceiving antenna 412, a reception circuit (not shown) for receiving radio waves from radio base stations to convert into electrical signals, and a transmission circuit (not shown) for converting electrical signals such as audio signals into radio waves for transmission. The radio communicator 410 receives the access point cell information T from the macro base station 100 forming the macro cell Cm in which the non-IRC terminal 400 is located or the pico base station 200 forming the pico cell Cp in which the non-IRC terminal 400 is located. The radio communicator 410 reports the terminal capability information (UE Capability information) UC and a reception power measurement result to the radio base station (macro base station 100 or pico base station 200) to which the user terminal is connected. As for the non-IRC terminal 400, the terminal capability information UC shows that the transmission source (user terminal) is a non-IRC terminal. As will be described later, for the non-IRC terminal 400, the terminal capability information UC may not include information indicating whether the transmission source (user terminal) is capable of executing interference rejection combining. In this case, the fact that the terminal capability information UC does not include information indicating whether the transmission source is capable of executing interference rejection combining means that the transmission source (user terminal) is a non-IRC terminal 400 incapable of executing interference rejection combining. The controller 430 includes as elements a terminal capability information transmitter 432, a reception quality measurer 434, a reception quality modifier 436, a reception quality reporter 438, and a connection executor 440, and has no IRC executor. The details of operations of the radio communicator 410 and the controller 430 will be described later.

Figure 5:
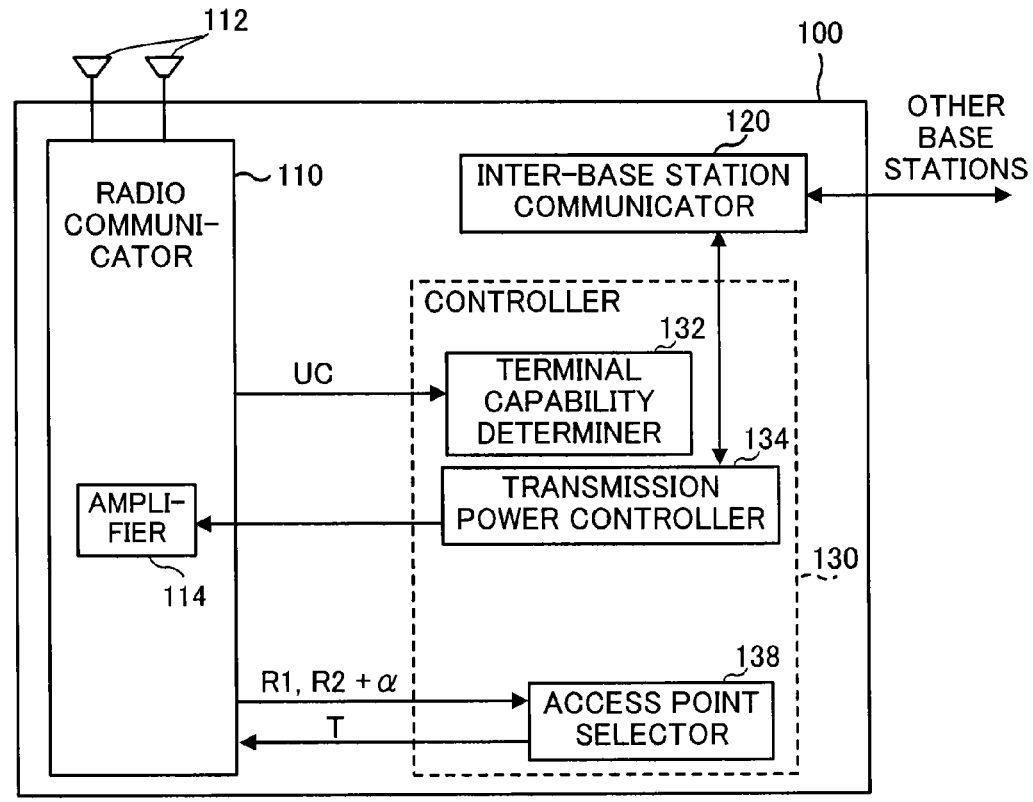
FIG. 5 is a block diagram showing the configuration of a macro base station according to the first embodiment of the present invention.

FIG. 5 is a block diagram showing the structure of the macro base station 100 according to the first embodiment of the present invention. The macro base station 100 includes a radio communicator 110, an inter-base station communicator 120, and a controller 130.

The radio communicator 110 is an element for performing radio communication with user terminals, and includes at least one transceiving antenna 112, a reception circuit (not shown) for receiving radio waves from user terminals and converting them to electrical signals, a transmission circuit (not shown) for converting electrical signals, such as a voice signal, to radio waves for transmission, and an amplifier 114 for adjusting the downlink transmission power. The radio communicator 110 transmits the access point cell information T to respective user terminals visiting the macro base station 100.

The inter-base station communicator 120 is an element for performing communication with other radio base stations (other macro base stations 100 and the pico base stations 200), and exchanges electrical signals with other base stations. For inter-base station communication, cable communication is utilized, but wireless communication may also be utilized.

The controller 130 includes, as its elements, a terminal capability determiner 132, a transmission power controller 134, and an access point selector 138. The controller 130, and the terminal capability determiner 132, the transmission power controller 134, and the access point selector 138 included in the controller 130 are functional blocks accomplished by the fact that a CPU in the macro base station 100 executes a computer program stored in a memory (not shown) and operates in accordance with the computer program.

Figure 6:
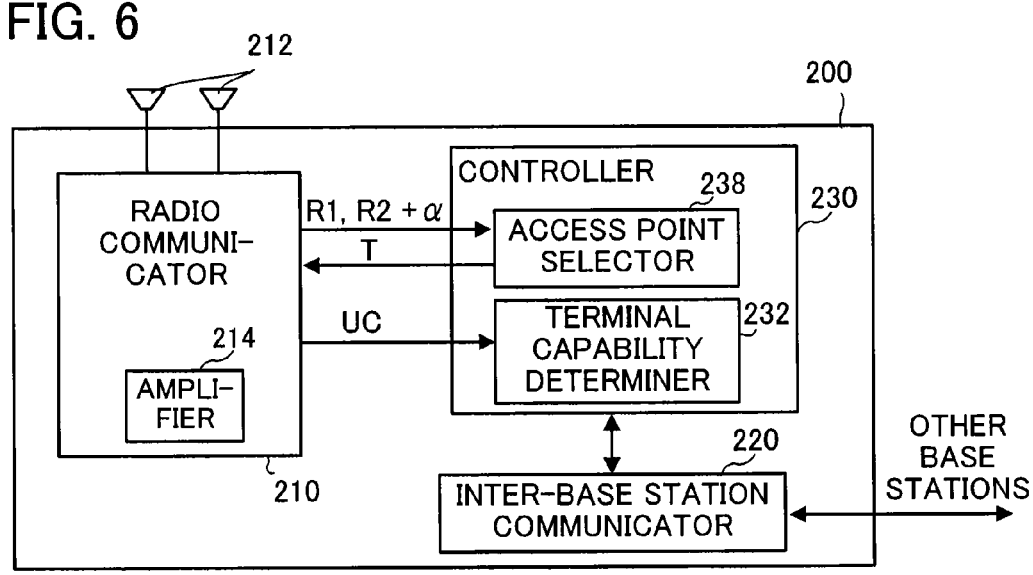
FIG. 6 is a block diagram showing the configuration of a pico base station according to the first embodiment of the present invention.

Details of operations of the controller 130 will be described later. FIG. 6 is a block diagram showing the structure of the pico base station 200 according to the first embodiment of the present invention. The pico base station 200 includes a radio communicator 210, an inter-base station communicator 220, and a controller 230.

The radio communicator 210 is an element for executing radio communication with user terminals and includes at least one transceiving antenna 212, a reception circuit (not shown) for receiving radio waves from user terminals and converting them to electrical signals, a transmission circuit (not shown) for converting electrical signals, such as a voice signal, to radio waves for transmission, and an amplifier 214 for adjusting the downlink transmission power.

The inter-base station communicator 220 is an element for executing communication with the macro base station 100, to which the pico base station 200 itself is connected, and exchanges electrical signals with the macro base station. For inter-base station communication, cable communication is utilized, but wireless communication may also be utilized.

The controller 230 of the pico base station 200 includes, as its elements, a terminal capability determiner 232 and an access point selector 238. The controller 230 of the pico base station 200, and the terminal capability determiner 232 and the access point selector 238 included in the controller 230 are functional blocks accomplished by the fact that a CPU in the pico base station 200 executes a computer program stored in a memory (not shown) and operates in accordance with the computer program. Details of operations of the controller 230 will be described later.

Cell range expansion (CRE) used in the radio communication system will be described. Each of the reception quality measurers 334 of the IRC terminals 300 and the reception quality measurers 434 of the non-IRC terminals 400 measures, as reception qualities of radio waves, the reception power (for example, the reference signal reception power (RSRP)) of radio waves received from the desired radio base station to which the user terminal 300 is connected and the reception power (for example, reference signal reception power) of radio waves received from another radio base station to which the user terminal is not connected. In the heterogeneous network, each of the reception quality measurers 334 and 434 measures the reception power of radio waves received from the macro base station 100 and the reception power of radio waves received from the pico base station 200. Regardless of whether the macro base station 100 is the desired radio base station or not, let us assume that the reception power value of radio waves from the macro base station 100 is a first reception power value R1, whereas let us assume that the reception power value of radio waves from the pico base station 200 is a second reception power value R2.

Each of the reception quality modifiers 336 of the IRC terminals 300 and the reception quality modifier 436 of the non-IRC terminals 400 increases the second reception power value R2 of radio waves from the pico base station 200 with the use of a predetermined CRE (cell range expansion) offset value (bias value) $\alpha$. For example, $\alpha$ may be simply added to R2, or $\alpha$ may be added to R2 in the units of dB. In any event, by this processing, the reception quality of radio waves from the pico base station 200 is seemingly improved. The second reception power value R2 thus modified will be called the modified second reception power value (R2+$\alpha$). The CRE offset value $\alpha$ is stored, for example, in a memory (not shown) of the user terminal.

The reception quality reporter 338 of the IRC terminal 300 transmits a signal indicating a reception power result report including the first reception power value R1 and the modified second reception power value (R2+$\alpha$) via the radio communicator 310 to the desired radio base station (macro base station 100 or pico base station 200). Similarly, the reception quality reporter 438 of the non-IRC terminals 400 transmits a signal indicating a reception power result report including the first reception power value R1 and the modified second reception power value (R2+$\alpha$) via the radio communicator 410 to the desired radio base station (macro base station 100 or pico base station 200).

If the desired radio base station for the user terminal is the macro base station 100, the signal indicating the reception power result report is received by the radio communicator 110 of the macro base station 100. On the basis of the reception power result report of each user terminal, the access point selector 138 of the macro base station 100 selects the radio base station to which the user terminal should be connected. In this case, the access point selector 138 selects the radio base station corresponding to the reception power value indicating the highest reception power (i.e., the reception quality value indicating the best reception quality) as the radio base station to which the user terminal should be connected. More specifically, with respect to a user terminal, in a case in which the first reception power value R1 is greater than the modified second reception power value (R2+$\alpha$), the access point selector 138 selects the macro base station 100 as the access point for the user terminal. With respect to a user terminal, in a case in which the modified second reception power value (R2+$\alpha$) is greater than the first reception power value R1, the access point selector 138 selects the pico base station 200 as the access point for the user terminal.

The access point selector 138 transmits access cell information indicating the selected radio access point to the user terminal connected with the macro base station 100. In addition, in a case in which the access point for the user terminal should be altered, the access point selector 138 informs the involved radio base stations (for example, the pico base station 200 or another macro base station 100 neighboring) that the access point for the user terminal should be altered, via the inter-base station communicator 120.

If the desired radio base station for the user terminal is a pico base station 200, the signal indicating the reception power result report is received by the radio communicator 210 of the pico base station 200. On the basis of the reception power result report of each user terminal, the access point selector 238 of the pico base station 200 selects the radio base station to which the user terminal should be selected connected. In this case, the access point selector 238 selects the radio base station corresponding to the reception power value indicating the highest reception power (i.e., the reception quality value indicating the best reception quality) as the radio base station to which the user terminal should be connected. The selection scheme is the same as that executed by the access point selector 138 of the macro base station 100.

The access point selector 238 transmits access cell information indicating the selected radio access point to the user terminal connected with the pico base station 200. In addition, in a case in which the access point for the user terminal should be altered, the access point selector 238 informs the involved radio base stations (for example, the macro base station 100 or another macro base station 100 neighboring) that the access point for the user terminal should be altered, via the inter-base station communicator 120.

The radio communicator 310 or 410 of the user terminal receives the access cell information T. In a case in which the access cell information T indicates the radio base station to which the user terminal has already been connected, the connection executor 340 or 440 of the user terminal maintains the connection. On the other hand, the access cell information T indicates another radio base station, the connection executor 340 or 440 of the user terminal executes operation for connecting to the radio base station. For example, when the user terminal is connected with the macro base station 100, and the user terminal receives access cell information T designating that the pico base station 200 is the access point, the connection executor 340 or 440 connects (offloads) the user terminal itself to the designated pico base station 200.

As described above, as a result of modification of the reception power value R2 of radio waves from the pico base station 200 by the CRE offset value α, the reception quality of radio waves from the pico base station 200 is seemingly improved. Therefore, the radius, and thus the range, of the pico cell Cp, is expanded, so that the processing load of the macro base station 100 is reduced.

The eICIC used in the radio communication system based on capability of user terminals will be described. The macro base station 100 is capable of executing wireless transmission to the user terminals using resources (each identified by frequency and time) that are the same as resources used by the pico base stations 200 in the macro cell Cm, and is configured to collaborate with the pico base stations 200 for eICIC (enhanced inter-cell interference control).

As described above, the IRC terminal 300 transmits, to the desired radio base station (the macro base station 100 or the pico base station 200), terminal capability information UC indicating that the transmission source user terminal is an IRC terminal, whereas the non-IRC terminal 400 transmits, to the desired radio base station, terminal capability information UC indicating that the transmission source user terminal is a non-IRC terminal. More specifically, the terminal capability information transmitter 332 of the IRC terminal 300 sets "1" to a bit indicating whether the transmission source user terminal is capable of interference rejection combining, "1" meaning that the user terminal is capable of executing interference rejection combining, and transmits the terminal capability information UC including the bit via the radio communicator 310. The terminal capability information transmitter 432 of the non-IRC terminal 400 sets "0" to the bit indicating whether the transmission source user terminal is capable of interference rejection combining, "0" meaning that the user terminal is not capable of executing interference rejection combining, and transmits the terminal capability information UC including the bit via the radio communicator 310.

It can be considered to set, in compliance with another communication standard, so that only the IRC terminal 300 includes information indicating that the transmission source user terminal is an IRC terminal in the terminal capability information UC. In this case, the non-IRC terminal does not include the information indicating whether the transmission source user terminal is capable of interference rejection combining in the terminal capability information UC; even so, the terminal capability information UC not including such information can be regarded as information indicating that the transmission source user terminal is not capable of executing interference rejection combining.

In a case in which the desired radio base station for a user terminal is the macro base station 100, the signal indicating the terminal capability information UC is received at the radio communicator 110 of the macro base station 100. The terminal capability determiner 132 of the controller 130 of the macro base station 100 determines whether the user terminal is the IRC terminal 300 or the non-IRC terminal 400 based on the terminal capability information UC reported from the user terminal. As a matter of course, when the terminal capability information UC indicates that the user terminal is capable of executing the interference rejection combining, the terminal capability determiner 132 determines that the user terminal is the IRC terminal 300, and when the terminal capability information UC does not include the information indicating that the user terminal is capable of executing the interference rejection combining, the terminal capability determiner 132 determines that the user terminal is the non-IRC terminal 400.

In a case in which the desired radio base station for the user terminal is the pico base station 200, the signal indicating the terminal capability information UC is received at the radio communicator 210 of the pico base station 200. The terminal capability determiner 232 of the controller 230 of the pico base station 200 determines whether the user terminal is the IRC terminal 300 or the non-IRC terminal 400 based on the terminal capability information UC reported from the user terminal. The terminal capability determiner 232 transfers a signal indicating the determination result to the macro base station 100 by means of the inter-base station communicator 220. The signal indicating the determination result is received by the inter-base station communicator 120 of the macro base station 100 and conveyed to the transmission power controller 134.

Thus, whether a user terminal is capable of interference rejection combining is recognized by the transmission power controller 134 of the macro base station 100 with regard to all user terminals connected with the pico base station 200 existing in the cell of the macro base station 100. The transmission power controller 134 calculates the statistical amount related to interference rejection combining capability of the user terminals connected with the pico base station 200. Specifically, the transmission power controller 134 counts the total number of all user terminals connected with the pico base station 200 and the number of all IRC terminals 300 connected with the pico base station 200, and calculates the proportion of the number of all the IRC terminals 300 connected with the pico base station 200 to the total number of all the user terminals connected with the pico base station 200 (when there are multiple pico base stations 200 in the macro cell Cm of the macro base station 100, the proportion of the number of all the IRC terminals 300 connected with the multiple pico base stations 200 to the total number of all the user terminals connected with the multiple pico base stations 200 is calculated). The transmission power controller 134 then sets a parameter for the eICIC based on the statistical amount.

In this embodiment, the transmission power controller 134 of the macro base station 100 does not calculate the statistical amount related to interference rejection combining capability of the user terminals connecting to the macro base station 100. Accordingly, no terminal capability determiner 132 needs to be provided in the macro base station 100. However, the terminal capability determiner 132 is preferably provided for other purposes, for example, in order to execute a suitable MIMO (multiple-input and multiple-output). This is the same for the following second to fifth embodiments and modification 1.

Figure 7:
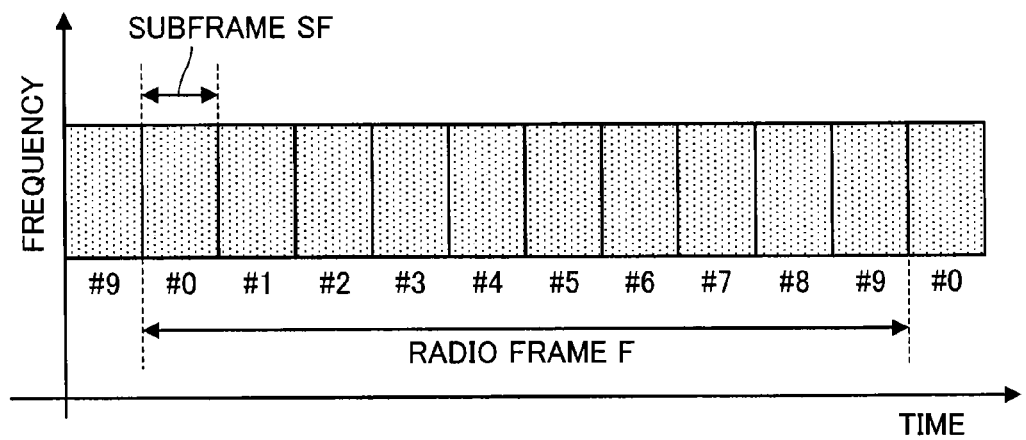
FIG. 7 is a view showing a format of the radio frame exchanged by communication elements in the radio communication system.

FIG. 7 is a view showing a format of the radio frame exchanged by communication elements in the radio communication system. The radio frame F is a transmission unit of radio signals sent from each communication elements (the macro base station 100, the pico base stations 200, and the user terminals), and occupies a predetermined time length (for example, 10 milliseconds) and a predetermined bandwidth. By transmitting radio frames F continuously, a series of radio signals are constructed.

Each radio frame F contains multiple subframes SF. The subframe SF is a transmission unit occupying a time length (for example, 1 millisecond) that is shorter than that of the radio frame F, and can be numbered from number 0 (#0) in ascending order within one radio frame F.

Figure 8:
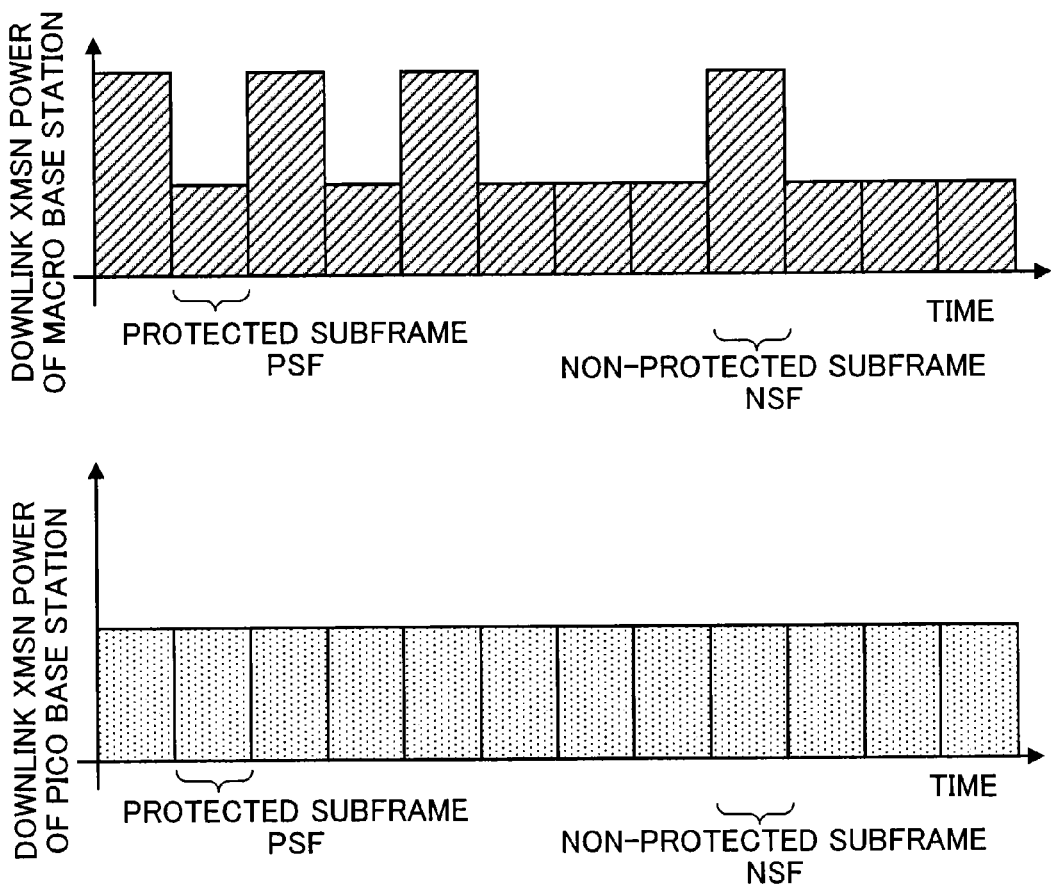
FIG. 8 includes a graph showing change in the downlink transmission power from the macro base station and a graph showing change in the downlink transmission power from the pico base station for showing an outline of time domain-based inter-cell interference control according to the first embodiment.

FIG. 8 is a schematic view for showing time domain-based inter-cell interference control according to this embodiment. For purposes of explanation of eICIC, let us assume that a macro base station 100 and a pico base station 200 forming the pico cell Cp in the macro cell Cm formed by the macro base station 100 send radio signals (radio frame F) with the use of a common radio frame timing and a common frequency band. Here, "radio signals are sent with the use of a common radio frame timing" is meant to indicated that the transmission start time of the radio frame F transmitted by the macro base station 100 is simultaneous with the transmission start time of the radio frame F transmitted by the pico base station 200. In other words, the radio communicator 110 of the macro base station 100 and the radio communicator 210 of the pico base station 200 can execute wireless communication in synchronization.

The radio signal from the macro base station 100 and the radio signal from the pico base station 200 are sent at the same frequency band, so as to interfere with each other. In particular, since the maximum transmission power of the macro base station 100 is greater than the maximum transmission power of the pico base station 200, the interference with the radio signal from the pico base station 200 resulting from the radio signal from the macro base station 100 is remarkably significant. Accordingly, if macro base station 100 always continuously sends the radio signals at a high transmission power, it is difficult for the user terminal of which the desired base station is the pico base station 200 to receive radio signals from the pico base station 200.

Accordingly, in the time domain-based eICIC, as shown in FIG. 8, whereas the pico base station 200 continuously executes downlink transmission at a constant transmission power, the macro base station 100 intermittently reduces the downlink transmission power. That is to say, the macro base station 100 executes downlink transmission at the maximum transmission power or a power close to the maximum transmission power for certain periods, but executes downlink transmission at a very low transmission power for other periods. The subframe SF at which the macro base station 100 executes downlink transmission at the lower transmission power (second downlink transmission power) is called a protected subframe PSF since the radio signal from the pico base station 200 is protected from interference by the macro base station 100. On the other hand, the subframe SF at which the macro base station 100 executes downlink transmission at the higher transmission power is called a non-protected subframe NSF.

At the protected subframes PSF, at which the radio communicator 110 of the macro base station 100 executes downlink transmission at the lower transmission power, the radio signal from the pico base station 200 is not likely to be subject to interference by the radio signal from the macro base station 100, so that the user terminals visiting the pico cell Cp defined by the pico base station 200 can receive the radio signal from the pico base station 200 at a good quality.

This embodiment is based on the time domain-based eICIC, the transmission power controller 134 of the macro base station 100 causes the radio communicator 110 to operate at the higher transmission power (first downlink transmission power) at non-protected subframes NSF (first resources) included in a unit resource (radio frame F) that occupies a predetermined length of time and a predetermined frequency bandwidth, and causes the radio communicator 110 to operate at the second downlink transmission power, which is lower than the first downlink transmission power, at protected subframes PSF (second resources) in the unit resource. The transmission power controller 134 adjusts, i.e., sets the downlink transmission power at the protected subframes PSF (second downlink transmission power) in the radio frame F in accordance with the statistical proportion of the number of the IRC terminals 300 to the total number of user terminals connected with the pico base stations 200. Examples of specific settings of the second downlink transmission power are described with reference to FIGS. 9 to 12.

Figure 9:
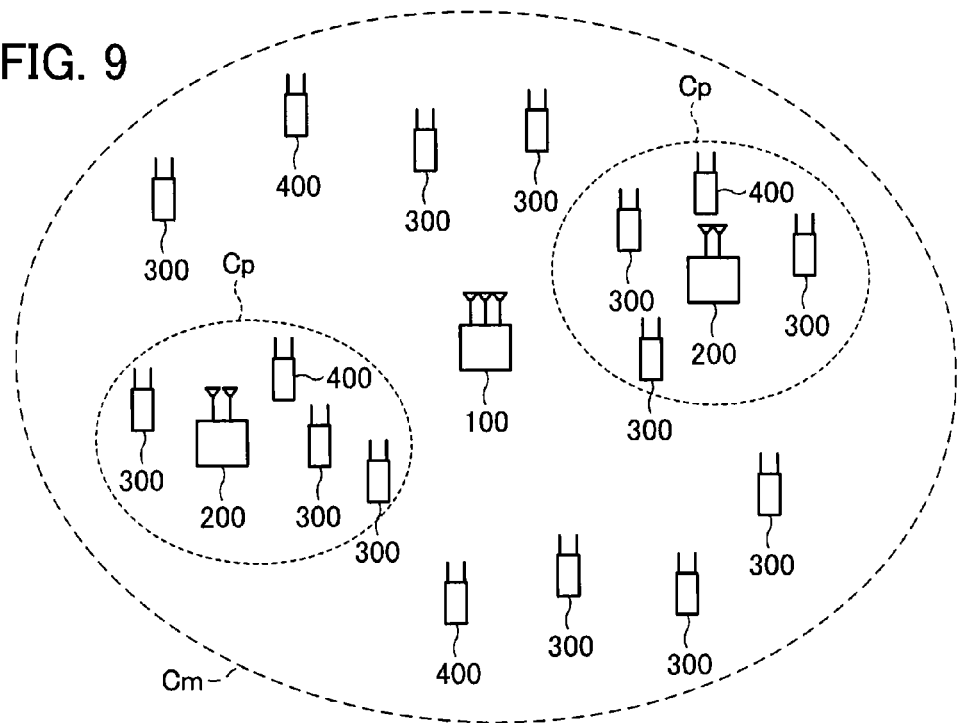
FIG. 9 is a diagram showing a radio communication system in which a large number of user terminals capable of executing interference rejection combining are located in pico cells.
Figure 10:
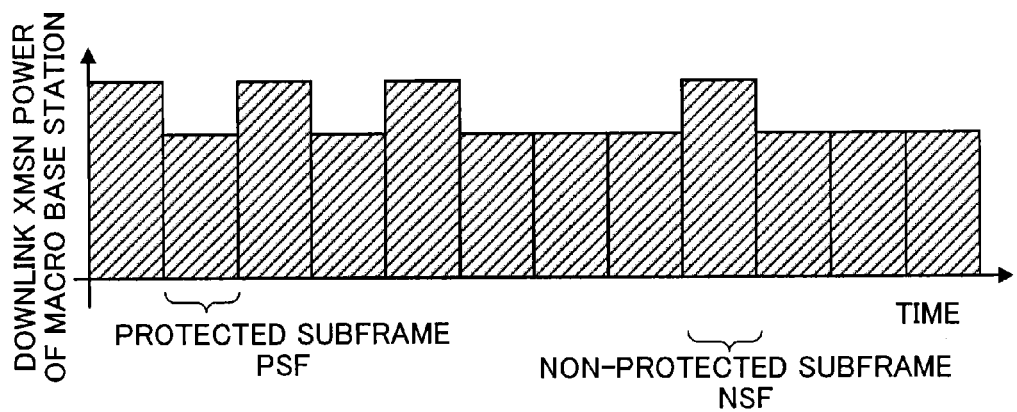
FIG. 10 is a graph showing change in the downlink transmission power from the macro base station as an example of time domain-based inter-cell interference control in the case of FIG. 9.

As shown in FIG. 9, in a case in which there are many IRC terminals 300 from among user terminals within the pico cells Cp, even if the downlink transmission power of the macro base station 100 is set at a high level, the many IRC terminals 300 in the pico cells Cp can suppress the interference caused by the macro base station 100. In this case, as shown in FIG. 10, it is appropriate to set the second downlink transmission power for protected subframes PSF (second resources) at a high level.

Figure 11:
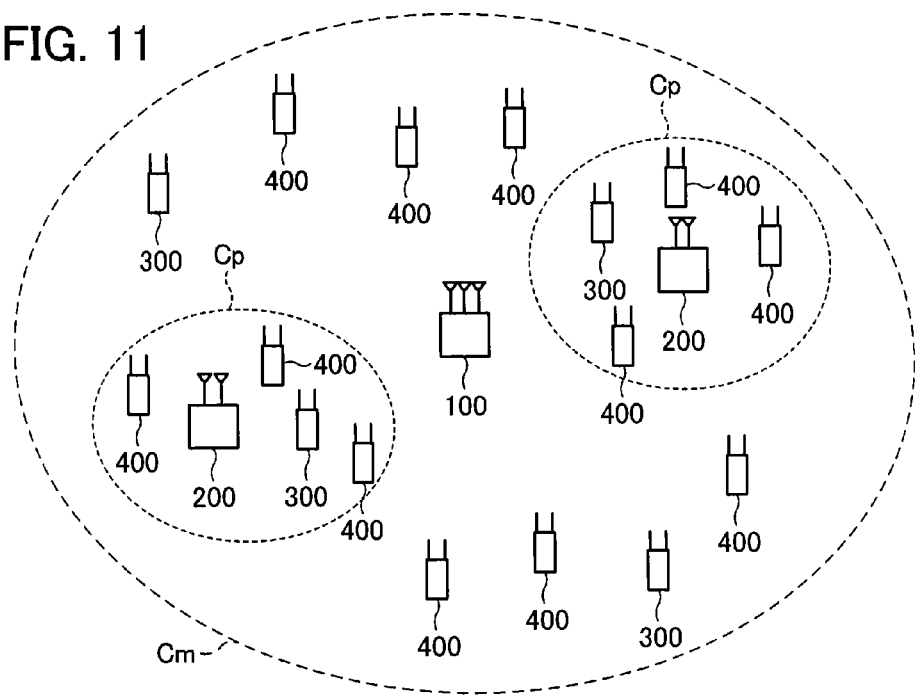
FIG. 11 is a diagram showing a radio communication system in which a small number of user terminals capable of executing interference rejection combining are located in pico cells.
Figure 12:
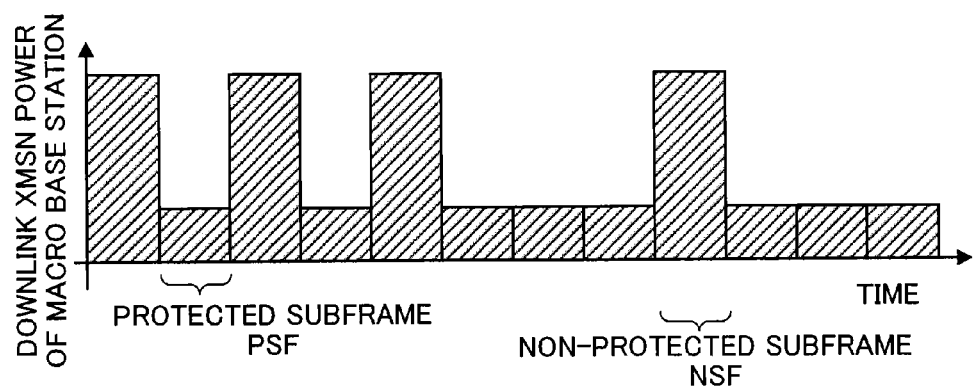
FIG. 12 is a graph showing change in the downlink transmission power from the macro base station as an example of time domain-based inter-cell interference control in the case of FIG. 11.

On the other hand, as shown in FIG. 11, in a case in which there are not many IRC terminals 300 from among user terminals within the pico cells Cp, if the downlink transmission power of the macro base station 100 is set at a high level, many non-IRC terminals 400 in the pico cells Cp are subject to degraded reception quality due to the interference from the macro base station 100. In this case, as shown in FIG. 12, it is appropriate to set the second downlink transmission power for protected subframes PSF (second resources) at a low level. Therefore, the transmission power controller 134 sets the second downlink transmission power for protected subframes PSF (second resources) in such a manner that the greater the statistical proportion of the number of the IRC terminals 300 to the total number of user terminals connected with the pico base stations 200, the higher the second downlink transmission power. Thus, in a radio communication system in which the macro base station 100 (high-power radio base station) and the pico base stations 200 (low-power radio base stations) coordinate with each other for the eICIC, the downlink transmission power at the macro base station 100 can be suitably controlled.

Because the eICIC is a technique to prevent or restrict interference to user terminals connected to low-power base stations, setting the second downlink transmission power for protected subframes PSF (second resources) based on the statistical amount with regard to multiple user terminals connected to the pico base stations 200 (low-power radio base stations) makes it possible to suitably control the second downlink transmission power for restricting interference to multiple user terminals connected with the pico base stations 200.

Upon setting the second downlink transmission power, the transmission power controller 134 controls the amplifier 114 of the radio communicator 110 on the basis of the second downlink transmission power. Thus, the radio communicator 110 executes downlink transmission at the higher first downlink transmission power at non-protected subframes NSF (first resources), whereas the radio communicator 110 executes downlink transmission at the lower second downlink transmission power, which is set by the transmission power controller 134, at protected subframes PSF (second resources).

For the setting of the second downlink transmission power based on the above statistical proportion, the transmission power controller 134 can use a table such as Table 1. This table can be stored in a storage unit (not shown) of the macro base station 100.

TABLE 1

| Proportion X | Downlink Transmission Power at Protected Subframes (Second Downlink Transmission Power) |
|---|---|
| 0 < X ≤ 0.10 | $Y_1$ |
| 0.10 < X ≤ 0.20 | $Y_2$ |
| 0.20 < X ≤ 0.30 | $Y_3$ |
| 0.30 < X ≤ 0.40 | $Y_4$ |
| 0.40 < X ≤ 0.50 | $Y_5$ |
| 0.50 < X ≤ 0.60 | $Y_6$ |
| 0.60 < X ≤ 0.70 | $Y_7$ |
| 0.70 < X ≤ 0.80 | $Y_8$ |
| 0.80 < X ≤ 1.00 | $Y_9$ |

In this table, the value of the second downlink transmission power is determined in accordance with a statistical proportion X. The transmission power controller 134 can select the value of the second downlink transmission power corresponding to the statistical proportion X from this table. As an alternative to such a table, the value of the second downlink transmission power may be calculated in accordance with the statistical proportion X in accordance with an equation.

Each of the terminal capability information transmitters 332 and 442 of the user terminals periodically reports the terminal capability information to the radio base station to which the user terminal is connected, and the terminal capability determiner 232 of each pico base station 200 periodically transfers the signal indicating the determination result of the terminal capability to the macro base station 100. The transmission power controller 134 of the macro base station 100 periodically calculates the statistical amount related to interference rejection combining capability of the user terminals connected with the pico base stations 200, and periodically decides the second downlink transmission power on the basis of the statistical amount. By repeating the decision of the second downlink transmission power in this manner, the second downlink transmission power can always be suitably adjusted.

As described above, in a case in which there are many IRC terminals 300 from among user terminals within the pico cells Cp, the second downlink transmission power for protected subframes PSF (second resources) is set at a high level, so that the downlink transmission efficiency at the macro base station 100 can be enhanced and the user terminals connected with the macro base station 100 can receive signals at a high efficiency. The signal reception efficiency at the user terminals connected with the macro base station 100 can be enhanced by setting the second downlink transmission power at a high level in addition to the use of cell range expansion, which contributes to enhancement of signal reception efficiency at the user terminals connected with the macro base station 100.

Specific reasons for the enhancement of transmission efficiency are, for example, reduction of signal losses for terminal reception power increased, possibility of use of higher code rates, and possibility of use of modulation schemes with higher modulation levels due to the higher transmission power. Modulation levels of modulation schemes will be described. For example, among 64 QAM (quadrature amplitude modulation), 16 QAM, and QPSK (quadrature phase shift keying), 64 QAM is the most susceptible to corruption by interference whereas QPSK is the least susceptible to corruption by interference. This is because the greater the modulation level, the shorter the distance between signal points. In the 3GPP, it is under consideration to provide a difference between the transmission power of the downlink data signal from the radio base station and that of the reference signal (for example, 3GPP TS 36.104, V11.0.0, Section 6.3.1.1, Table 6.3.1.1-1). As described above, the second downlink transmission power is reduced at protected subframes PSF, but the transmission power of the reference signal is constant. The downlink transmission power at protected subframes PSF is reduced for the data signal, but the reference signal is sent at a constant transmission power that is greater than the second downlink transmission power. In OFDMA used for downlink transmission in the LTE, subcarriers are mutually orthogonal, so that subcarriers do not interfere with one another, in theory. However, actually, at user terminals, which are receiving side of downlink transmission, the data signal sent at a low power is interfered with by the reference signal sent at a high power. In other words, the reference signal interferes with the data signal of which the transmission source radio base station is the transmission source radio base station of the reference signal. The greater the difference between the transmission power of the reference signal and that of the data signal, the greater the interference by the reference signal with the data signal.

In a case in which the difference between the transmission power of the reference signal and that of the data signal at protected subframes PSF is great, the interference with the data signal is significant, so that signal modulation schemes in which modulation levels are high (for example, 64 QAM) are considered to be inappropriate. However, when the second downlink transmission power is set to a high level, the difference between the transmission power of the reference signal and that of the data signal at protected subframes PSF is reduced, so that the interference to the data signal caused by the difference is small. Accordingly, signal modulation schemes of which modulation levels are high can be used for modulation schemes of the data signal, so that transmission efficiency can be improved.

Second Embodiment

In the first embodiment, the terminal capability determiner 232 of the pico base station 200 transfers the signal indicating the determination result of the terminal capability to the macro base station 100, and the transmission power controller 134 of the macro base station 100 calculates the statistical amount related to interference rejection combining capability of the user terminals connected with the pico base stations 200. However, in a second embodiment, the controller 230 of the pico base station 200 may calculate the statistical amount, and may report the statistical amount to the macro base station 100.

More specifically, the controller 230 of the pico base station 200 counts the total number of all user terminals connected with the pico base station 200 and the number of all IRC terminals 300 connected with the pico base station 200, and calculates the proportion of the number of all the IRC terminals 300 connected with the pico base station 200 to the total number of all the user terminals connected with the pico base station 200. The calculated proportion is reported via the inter-base station communicators 220 and 120 to the macro base station 100, and the transmission power controller 134 of the macro base station 100 sets the parameter for eICIC, i.e., the second downlink transmission power on the basis of this statistical amount.

Since the pico base station 200 does not send the signal indicating the determination result of the terminal capability of each individual user terminal to the macro base station 100, and sends the statistical amount calculated at the pico base station 200 to the macro base station 100, it is possible to reduce the traffic amount between the pico base station 200 and the macro base station 100.

In a case in which there are multiple pico base stations 200 in the macro cell Cm of the macro base station 100, each of the multiple pico base stations 200 reports the statistical amount, i.e., the proportion of the IRC terminals 300 to the macro base station 100. In this case, the transmission power controller 134 of the macro base station 100 sets the second downlink transmission power in accordance with any of the following ways.

The transmission power controller 134 of the macro base station 100 may calculate the average value or the median value of the statistical amounts, i.e., the proportions of the IRC terminals 300 reported from multiple pico base stations 200. Then, on the basis of the average value or the median value, the transmission power controller 134 sets the second downlink transmission power in accordance with a table such as Table 1 or an equation.

The transmission power controller 134 of the macro base station 100 may seek the minimum value from among the statistical amounts, i.e., the proportions of the IRC terminals 300 reported from multiple pico base stations 200. Then, on the basis of the minimum value, the transmission power controller 134 sets the second downlink transmission power in accordance with a table such Table 1 or an equation. In a case in which the proportion of the IRC terminals 300 is great, it is possible to set the second downlink transmission power at a high level, but when the second downlink transmission power is high, there may be serious interference with non-IRC terminal 400 located in the pico cells Cp, in particular, in a pico cell Cp in which the proportion of the non-IRC terminals 400 is great, there is a concern that significant deleterious effects will be exerted on the non-IRC terminals 400. By setting the second downlink transmission power on the basis of the minimum value among the proportions of the IRC terminals 300 reported from multiple pico base stations 200, it is possible to reduce concern of interference given to non-IRC terminals 400 located in all pico cells Cp within the macro cell Cm.

The transmission power controller 134 of the macro base station 100 may seek the maximum value from among the statistical amounts, i.e., the proportions of the IRC terminals 300 reported from multiple pico base stations 200. Then, on the basis of the maximum value, the transmission power controller 134 sets the second downlink transmission power in accordance with a table such as Table 1 or an equation. By setting the second downlink transmission power on the basis of the maximum value among the proportions of the IRC terminals 300 reported from multiple pico base stations 200, it is possible to use the second downlink transmission power at a higher level. In this case, in a pico cell Cp in which the proportion of the non-IRC terminals 400 is great, there is concern that significant deleterious effects will be exerted on the non-IRC terminals 400, but there is an advantage that the transmission efficiency from the macro base station 100 is more improved.

Third Embodiment

In the first embodiment, the transmission power controller 134 of the macro base station 100 sets the second downlink transmission power for protected subframes PSF (second resources) on the basis of the proportion of the number of IRC terminals 300 to the total number of user terminals connected with the pico base stations 200. However, in a third embodiment, the transmission power controller 134 may set the second downlink transmission power for protected subframes PSF on the basis of the downlink traffic amount for the IRC terminals 300 to the total downlink traffic amount for user terminals connected with the pico base stations 200.

In the third embodiment, the structures of the macro base station 100, the pico base stations 200, and the user terminals (the IRC terminals 300 and the non-IRC terminals 400) may be the same as those according to the first embodiment. The features that are the same as those in the first embodiment will not be described here in detail. However, the following features are different.

The terminal capability determiner 232 (FIG. 6) of the controller 230 of the pico base station 200 determines, based on the terminal capability information UC reported from a user terminal connected with the pico base station 200, whether the user terminal is the IRC terminal 300 or the non-IRC terminal 400. Furthermore, the controller 230 of the pico base station 200 monitors the traffic amount with respect to each user terminal connected with the pico base station 200. The controller 230 calculates the total downlink traffic amount for all user terminals connected with the pico base station 200 and also calculates the downlink traffic amount for all IRC terminals 300 connected with the pico base station 200.

The controller 230 transfers a signal indicating these calculation results to the macro base station 100 by means of the inter-base station communicator 220. The signal indicating the calculation results is received by the inter-base station communicator 120 of the macro base station 100 and conveyed to the transmission power controller 134.

Thus, the total downlink traffic amount for all user terminals connected with the pico base station 200 existing in the cell of the macro base station 100 and the total downlink traffic amount for all IRC terminals 300 connected with the pico base station 200 are recognized by the transmission power controller 134 of the macro base station 100. The transmission power controller 134 calculates the statistical amount related to interference rejection combining capability of the user terminals connected with the pico base stations 200. Specifically, the transmission power controller 134 calculates the statistical proportion of the downlink traffic amount for all the IRC terminals 300 connected with the pico base station 200 to the total downlink traffic amount for all the user terminals connected with the pico base station 200 (when there are multiple pico base stations 200 in the macro cell Cm of the macro base station 100, the proportion of the downlink traffic amount for all the IRC terminals 300 connected with the multiple pico base stations 200 to the total downlink traffic amount for all the user terminals connected with the multiple pico base stations 200 is calculated). The transmission power controller 134 then sets the parameter for the eICIC based on the statistical amount. That is to say, the transmission power controller 134 of the macro base station 100 sets the second downlink transmission power for protected subframes PSF on the basis of the downlink traffic amount for the IRC terminals 300 connected with the pico base stations 200 to the total downlink traffic amount for user terminals connected with the pico base stations 200.

In a case in which the proportion of the downlink traffic amount for the IRC terminals 300 connected with the pico base stations 200 to the total downlink traffic amount for the user terminals connected with the pico base stations 200 is large, even if the downlink transmission power of the macro base station 100 is set at a high level, the IRC terminals 300 that are in the pico cells Cp and that use a large amount of traffic can suppress the interference caused by the macro base station 100. In this case, as shown in FIG. 10, it is appropriate to set the second downlink transmission power for protected subframes PSF (second resources) at a high level.

On the other hand, in a case in which the proportion of the downlink traffic amount for the IRC terminals 300 connected with the pico base stations 200 to the total downlink traffic amount for the user terminals connected with the pico base stations 200 is small, the downlink transmission power of the macro base station 100 is set at a high level, the non-IRC terminals 400 that are in the pico cells Cp and using a large amount of traffic are subject to degraded reception quality due to the interference from the macro base station 100. In this case, as shown in FIG. 12, it is appropriate to set the second downlink transmission power for protected subframes PSF (second resources) at a low level. Therefore, the transmission power controller 134 sets the second downlink transmission power for protected subframes PSF (second resources) in such a manner that the greater the proportion of the downlink traffic amount for the IRC terminals 300 connected with the pico base stations 200 to the total downlink traffic amount for the user terminals connected with the pico base stations 200, the higher the second downlink transmission power. Thus, in a radio communication system in which the macro base station 100 (high-power radio base station) and the pico base stations 200 (low-power radio base stations) coordinate with each other for the eICIC, the downlink transmission power at the macro base station 100 can be suitably controlled.

Because the eICIC is a technique to prevent or restrict interference with user terminals connected to low-power base stations, setting the second downlink transmission power for protected subframes PSF (second resources) based on the statistical amount with regard to multiple user terminals connected to the pico base stations 200 (second radio base stations) makes it possible to suitably control the second downlink transmission power for restricting interference to multiple user terminals connected with the pico base stations 200. In comparison with the first embodiment, since the second downlink transmission power is set on the basis of the traffic amounts in this embodiment, the second downlink transmission power can be controlled more suitably.

In a similar way as in the first embodiment, the transmission power controller 134 may use a table similar to a table such as Table 1 or an equation for setting the second downlink transmission power based on the above statistical proportion.

Each of the terminal capability information transmitters 332 and 442 of the user terminals periodically reports the terminal capability information to the radio base station to which the user terminal is connected, and the controller 230 of each pico base station 200 periodically calculates the total downlink traffic amount for all user terminals connected with the pico base station 200 and the downlink traffic amount for all IRC terminals 300 connected with the pico base station 200, and periodically transfers the signal indicating the calculation results to the macro base station 100. The transmission power controller 134 of the macro base station 100 periodically calculates the statistical amount related to interference rejection combining capability of the user terminals connected with the pico base stations 200, and periodically decides the second downlink transmission power on the basis of the statistical amount. By repeating the decision of the second downlink transmission power in this manner, the second downlink transmission power can always be suitably adjusted.

As described above, in a case in which the downlink traffic amount for the IRC terminals 300 from among user terminals within the pico cells Cp is large, the second downlink transmission power for protected subframes PSF (second resources) is set at a high level, so that the downlink transmission efficiency at the macro base station 100 can be enhanced and the user terminals connected with the macro base station 100 can receive signals at a high efficiency. The signal reception efficiency at the user terminals connected with the macro base station 100 can be enhanced by setting the second downlink transmission power at a high level in addition to the use of cell range expansion, which contributes to enhancement of signal reception efficiency at the user terminals connected with the macro base station 100.

An example of the above-described traffic amount may be the transmission rate of downlink data received by each user terminal connected with the pico base stations 200, and an example of the total traffic amount may be the sum of the transmission rates of downlink data received by all user terminals connected with the pico base stations 200. Alternatively, an example of the above-described traffic amount may be the amount of data temporally stored in the pico base stations 200 for transmission to each user terminal, and an example of the total traffic amount may be the sum of the amounts of data temporally stored in the pico base stations 200 for transmission to all user terminals. Alternatively, an example of the above-described traffic amount may be the number of calls received by each user terminal connected with the pico base stations 200, and an example of the total traffic amount may be the sum of the number of calls received by all user terminals connected with the pico base stations 200.

Fourth Embodiment

In the third embodiment, the controller 230 of the pico base station 200 transfers the signal indicating the total downlink traffic amount for all user terminals connected with the pico base station 200 and the downlink traffic amount for all IRC terminals 300 connected with the pico base station 200 to the macro base station 100, and the transmission power controller 134 of the macro base station 100 calculates the statistical amount related to interference rejection combining capability of the user terminals connected with the pico base stations 200. However, in a fourth embodiment, the controller 230 of the pico base station 200 may calculate the statistical amount, and may report the statistical amount to the macro base station 100.

More specifically, the controller 230 of the pico base station 200 calculates the total downlink traffic amount for all user terminals connected with the pico base station 200 and the downlink traffic amount for all IRC terminals 300 connected with the pico base station 200, and calculates the statistical proportion of the downlink traffic amount for all IRC terminals 300 connected with the pico base station 200 to the total downlink traffic amount for all user terminals connected with the pico base station 200. The calculated proportion is reported via the inter-base station communicators 220 and 120 to the macro base station 100, and the transmission power controller 134 of the macro base station 100 sets the parameter for eICIC, i.e., the second downlink transmission power on the basis of this statistical amount.

Since the pico base station 200 does not send the signal indicating the total downlink traffic amount for all user terminals connected with the pico base station 200 and the downlink traffic amount for all IRC terminals 300 connected with the pico base station 200 to the macro base station 100, and sends the statistical proportion calculated at the pico base station 200 to the macro base station 100, it is possible to reduce the traffic amount between the pico base station 200 and the macro base station 100.

In a case in which there are multiple pico base stations 200 in the macro cell Cm of the macro base station 100, each of the multiple pico base stations 200 reports the statistical amount, i.e., the proportion of the downlink traffic amount for the IRC terminals 300 to the macro base station 100. In this case, the transmission power controller 134 of the macro base station 100 sets the second downlink transmission power in accordance with any of the following manners.

The transmission power controller 134 of the macro base station 100 may calculate the average value or the median value of the statistical amounts, i.e., the proportions of the downlink traffic amount for the IRC terminals 300 reported from multiple pico base stations 200. Then, on the basis of the average value or the median value, the transmission power controller 134 sets the second downlink transmission power in accordance with a table such as Table 1 or an equation.

The transmission power controller 134 of the macro base station 100 may seek the minimum value from among the statistical amounts, i.e., the proportions of the downlink traffic amount for the IRC terminals 300 reported from multiple pico base stations 200. Then, on the basis of the minimum value, the transmission power controller 134 sets the second downlink transmission power in accordance with a table such as Table 1 or an equation. In a case in which the proportion of the IRC terminals 300 is large, it is possible to set the second downlink transmission power at a high level, but when the second downlink transmission power is high, interference with non-IRC terminal 400 located in the pico cells Cp may be substantial, in particular, in a pico cell Cp in which the proportion of the non-IRC terminals 400 is large, there is concern that significant deleterious effects will be exerted on the non-IRC terminals 400. By setting the second downlink transmission power on the basis of the minimum value among the proportions of the downlink traffic amount for the IRC terminals 300 reported from multiple pico base stations 200, it is possible to reduce the concern about interference with non-IRC terminals 400 located in all pico cells Cp within the macro cell Cm.

The transmission power controller 134 of the macro base station 100 may seek the maximum value from among the statistical amounts, i.e., the proportions of the downlink traffic amount for the IRC terminals 300 reported from multiple pico base stations 200. Then, on the basis of the maximum value, the transmission power controller 134 sets the second downlink transmission power in accordance with a table such as Table 1 or an equation. By setting the second downlink transmission power on the basis of the maximum value among the proportions of the downlink traffic amount for the IRC terminals 300 reported from multiple pico base stations 200, it is possible to use the second downlink transmission power at a higher level. In this case, in a pico cell Cp in which the proportion of the non-IRC terminals 400 is large, there is concern that significant deleterious effects will be exerted on the non-IRC terminals 400, but there is an advantage in that the transmission efficiency from the macro base station 100 may be further improved.

Fifth Embodiment

In the third and fourth embodiments, the transmission power controller 134 of the macro base station 100 sets the parameter for eICIC, i.e., the second downlink transmission power on the basis of the proportion of the downlink traffic amount for all IRC terminals 300 connected with at least one pico base station 200 to the total downlink traffic amount for all user terminals connected with the at least one pico base station 200. However, in a fifth embodiment, instead of the proportion of the traffic amount, it is possible to use the number of downlink resource blocks (each identified by frequency and time) allocated by the pico base station 200 to the IRC terminals 300 connected with the pico base station 200.

In the fifth embodiment, the structures of the macro base station 100, the pico base stations 200, and the user terminals (the IRC terminals 300 and the non-IRC terminals 400) may be the same as those according to the first embodiment. The features that are the same as in the first embodiment will not be described here in detail. However, the following features are different.

The controller 230 of the pico base station 200 counts the number of downlink resource blocks allocated by the pico base station 200 to the IRC terminals 300 connected with the pico base station 200, and transfers a signal indicating the counted value to the macro base station 100 by means of the inter-base station communicator 220. The signal indicating the counted value is received by the inter-base station communicator 120 of the macro base station 100 and conveyed to the transmission power controller 134.

The transmission power controller 134 sets the second downlink transmission power on the basis of the counted value, i.e., the number of downlink resource blocks for the IRC terminals 300. In a case in which the number of downlink resource blocks for the IRC terminals 300 is great, the transmission power controller 134 sets the downlink transmission power of the macro base station 100 at a high level. In a case in which the number of downlink resource blocks for the IRC terminals 300 is small, the transmission power controller 134 sets the downlink transmission power of the macro base station 100 at a low level. Thus, it is possible to suitably control the second downlink transmission power for restricting interference to multiple user terminals connected with the pico base stations 200. In comparison with the first embodiment, since the second downlink transmission power is set on the basis of the number of resource blocks actually used in this embodiment, the second downlink transmission power can be controlled more suitably. In addition, since the number of downlink resource blocks allocated by the pico base station 200 to the IRC terminals 300 can be precisely and easily recognized by the pico base station 200, the second downlink transmission power can be controlled more suitably and easily.

The transmission power controller 134 may use a table that is similar to a table such as Table 1 or an equation for setting the second downlink transmission power based the number of downlink resource blocks for the IRC terminals 300.

The controller 230 of the pico base station 200 may calculate the proportion of the counted value to the number of all resource blocks available for downlink communication at the pico base station 200, and may transfer a signal indicating the proportion to the macro base station 100, and the transmission power controller 134 may set the second downlink transmission power on the basis of the proportion. However, since the number of all resource blocks available for downlink communication at the pico base station 200 is unchanged and constant, the above-mentioned counted value is equivalent to this proportion, so that it is not always necessary to calculate the proportion.

In a case in which there are multiple pico base stations 200 in the macro cell Cm of the macro base station 100, each of the multiple pico base stations 200 reports the statistical amount, i.e., the number of downlink resource blocks for the IRC terminals 300 to the macro base station 100. In this case, the transmission power controller 134 of the macro base station 100 sets the second downlink transmission power in accordance with any of the following manners.

The transmission power controller 134 of the macro base station 100 may calculate the sum, the average value, or the median value of the statistical amounts, i.e., the numbers of downlink resource blocks for the IRC terminals 300 reported from multiple pico base stations 200. Then, on the basis of the sum, the average value, or the median value, the transmission power controller 134 sets the second downlink transmission power in accordance with a table or an equation.

The transmission power controller 134 of the macro base station 100 may seek the minimum value from among the statistical amounts, i.e., the numbers of downlink resource blocks for the IRC terminals 300 reported from multiple pico base stations 200. Then, on the basis of the minimum value, the transmission power controller 134 sets the second downlink transmission power in accordance with a table or an equation. In a case in which the number of downlink resource blocks for the IRC terminals 300 is large, it is possible to set the second downlink transmission power at a high level, but when the second downlink transmission power is high, interference with non-IRC terminal 400 located in the pico cells Cp may be substantial, in particular, in a pico cell Cp in which the proportion of the non-IRC terminals 400 is large, there is concern that significant deleterious effects will be exerted on the non-IRC terminals 400. By setting the second downlink transmission power on the basis of the minimum value among the numbers of downlink resource blocks for the IRC terminals 300 reported from multiple pico base stations 200, it is possible to reduce concern about interference given to non-IRC terminals 400 located in all pico cells Cp within the macro cell Cm.

The transmission power controller 134 of the macro base station 100 may seek the maximum value from among the statistical amounts, i.e., the numbers of downlink resource blocks for the IRC terminals 300 reported from multiple pico base stations 200. Then, on the basis of the maximum value, the transmission power controller 134 sets the second downlink transmission power in accordance with a table or an equation. By setting the second downlink transmission power on the basis of the maximum value among the numbers of downlink resource blocks for the IRC terminals 300 reported from multiple pico base stations 200, it is possible to use the second downlink transmission power at a higher level. In this case, in a pico cell Cp in which the number of downlink resource blocks for the non-IRC terminals 400 is large, there is concern that significant deleterious effects will be exerted on the non-IRC terminals 400, but there is an advantage in that the transmission efficiency from the macro base station 100 will be further improved.

The controller 230 of the pico base station 200 periodically counts the number of downlink resource blocks allocated to IRC terminals 300 connected with the pico base station 200, and periodically transfers a signal indicating the counted value to the macro base station 100. The transmission power controller 134 of the macro base station 100 periodically decides the second downlink transmission power on the basis of the counted value. By repeating the decision of the second downlink transmission power in this manner, the second downlink transmission power can always be suitably adjusted.

As described above, in a case in which the number of downlink resource blocks for the IRC terminals 300 from among user terminals within the pico cells Cp is large, the second downlink transmission power for protected subframes PSF (second resources) is set at a high level, so that the downlink transmission efficiency at the macro base station 100 can be enhanced and the user terminals connected with the macro base station 100 can receive signals at a high efficiency. The signal reception efficiency at the user terminals connected with the macro base station 100 can be enhanced by setting the second downlink transmission power at a high level in addition to the use of cell range expansion, which contributes to enhancement of signal reception efficiency at the user terminals connected with the macro base station 100.

Sixth Embodiment

In the above-described first embodiment, the transmission power controller 134 of the macro base station 100 sets the second downlink transmission power for protected subframes PSF (second resources) on the basis of the proportion of the number of IRC terminals 300 to the total number of user terminals connected with the pico base stations 200. However, in a sixth embodiment, the transmission power controller 134 may set the second downlink transmission power for protected subframes PSF (second resources) based on the number of the IRC terminals 300 to the total number of user terminals connected with the macro base station 100.

Figure 13:
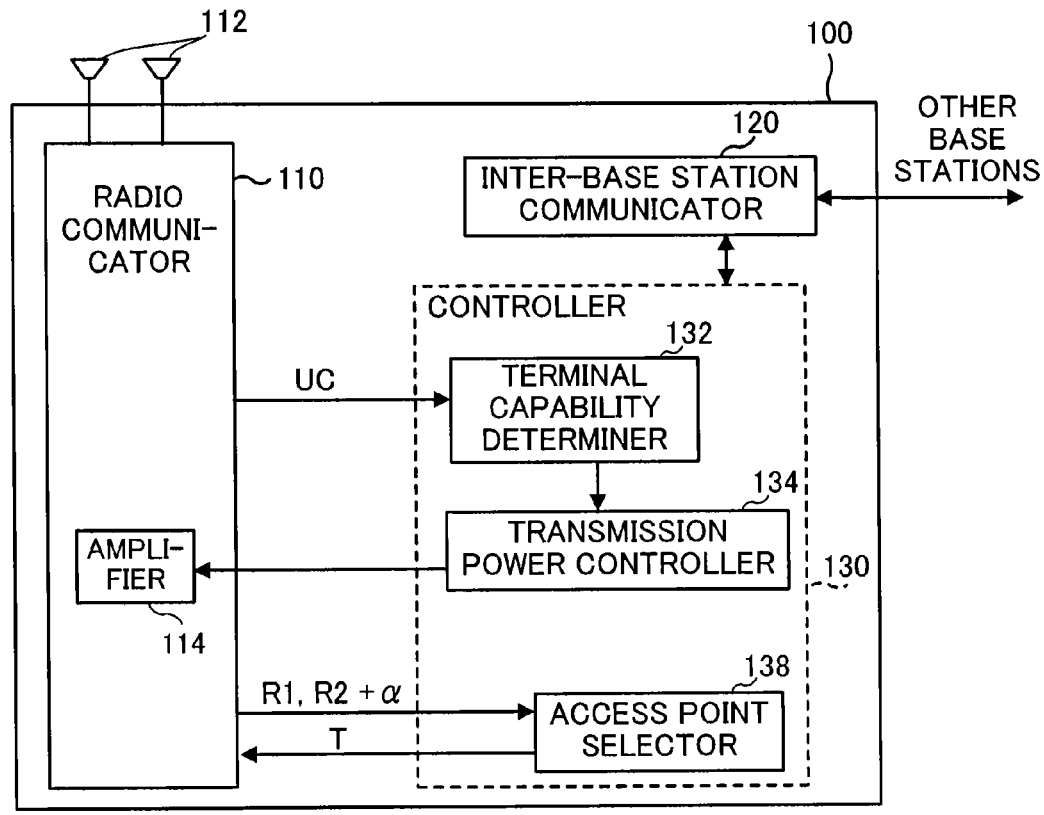
FIG. 13 is a block diagram showing the configuration of a macro base station according to a sixth embodiment of the present invention.

In the sixth embodiment, the structure of a user terminal (the IRC terminal 300 and the non-IRC terminal 400) may be the same as those according to the first embodiment. The features that are the same as in the first embodiment will not be described here in detail. However, as shown in FIG. 13, in the macro base station 100, the transmission power controller 134 sets the second downlink transmission power for protected subframes PSF (second resources) based on the type of a user terminal determined by the terminal capability determiner 132 of the macro base station 100.

Figure 14:
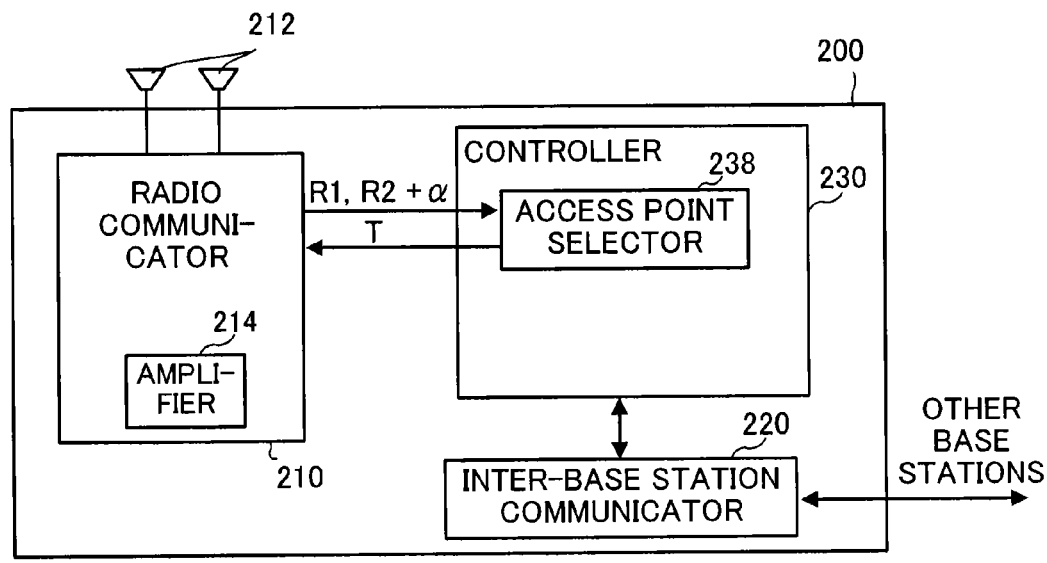
FIG. 14 is a block diagram showing the configuration of a pico base station according to the sixth embodiment of the present invention.

Also, as shown in FIG. 14, the pico base station 200 does not include the terminal capability determiner 232 in the controller 230. This is because, in this embodiment, the transmission power controller 134 of the macro base station 100 does not calculate the statistical amount related to interference rejection combining capability of user terminals connected with the pico base stations 200. However, the terminal capability determiner 232 is preferably provided for other purposes, for example, in order to execute a suitable MIMO. In any case, unlike the first embodiment, a signal indicating a determination result indicating whether a user terminal connected with the pico base station 200 is the IRC terminal 300 or the non-IRC terminal 400 is not transferred to the macro base station 100. This is the same in the following seventh embodiment, the eighth embodiment, and modification 2.

In a case in which the desired radio base station for a user terminal is the macro base station 100, the signal indicating the terminal capability information UC is received at the radio communicator 110 of the macro base station 100. The terminal capability determiner 132 of the controller 130 of the macro base station 100 determines whether the user terminal is the IRC terminal 300 or the non-IRC terminal 400 based on the terminal capability information UC reported from the user terminal. As a matter of course, when the terminal capability information UC indicates that the user terminal is capable of executing the interference rejection combining, the terminal capability determiner 132 determines that the user terminal is the IRC terminal 300, and when the terminal capability information UC does not include the information indicating that the user terminal is capable of executing the interference rejection combining, the terminal capability determiner 132 determines that the user terminal is the non-IRC terminal 400. This result of the determination is conveyed to the transmission power controller 134.

Thus, whether respective user terminals are capable of interference rejection combining is recognized by the transmission power controller 134 of the macro base station 100 with regard to all user terminals connected with the macro base station 100. The transmission power controller 134 calculates the statistical amount related to interference rejection combining capability of the user terminals connected with the macro base station 100. Specifically, the transmission power controller 134 counts the total number of all the user terminals connected with the macro base station 100 and the number of all IRC terminals 300 connected with the macro base station 100, and calculates the proportion of all the IRC terminals 300 connected with the macro base station 100 to the total number of all the user terminals connected with the macro base station 100. The transmission power controller 134 then sets the parameter for the eICIC based on this statistical amount. That is to say, the transmission power controller 134 of the macro base station 100 sets the second downlink transmission power for protected subframes PSF (second resources) according to the statistical proportion of the number of the IRC terminals 300 to the total number of the user terminals connected with the macro base station 100.

Because the eICIC is a technique to prevent or restrict interference with user terminals connected to the pico base stations 200, as in the first embodiment, it is possible to set the second downlink transmission power for restricting interference to multiple user terminals connected to the pico base stations 200 on the basis of the statistical amount with regard to multiple user terminals connected to the pico base stations 200 (low-power radio base stations). However, transmission of information (e.g., the report of the statistical amount) from the pico base stations 200 to the macro base station 100 as in the first embodiment is necessary in order for the macro base station 100 (high-power radio base station) to recognize the statistical amount with regard to plural user terminals connected with the pico base stations 200 (low-power radio base stations). However, as shown in FIGS. 9 and 11, the proportion of the number of the IRC terminals 300 from among the total number of multiple user terminals connected with the pico base stations 200 is considered to be almost the same as the proportion of the number of the IRC terminals 300 from among the total number of multiple user terminals connected with the macro base station 100. For multiple radio base stations that are very remote from one another, it is difficult to be certain that the statistical values with respect to IRC terminals 300 at a radio base station is almost the same as the statistical values with respect to the IRC terminals 300 at another radio base station. However, it is considered that the statistical values with respect to the IRC terminals 300 at a radio base station is almost the same as the statistical values with respect to IRC terminals 300 at another radio base station for multiple radio base stations that are close to one other. Accordingly, in the sixth embodiment, the second downlink transmission power for protected subframes PSF (second resources) is set based on the statistical amount with regard to multiple user terminals connected with the macro base station 100 (high-power radio base station).

As shown in FIG. 9, in a case in which there are many IRC terminals 300 from among user terminals connected with the macro base station 100, there will be many IRC terminals 300 from among user terminals within the pico cells Cp. In a case in which there are many IRC terminals 300 from among user terminals within the pico cells Cp, even if the downlink transmission power of the macro base station 100 is set at a high level, the many IRC terminals 300 in the pico cells Cp can suppress the interference caused by the macro base station 100. In this case, as shown in FIG. 10, it is appropriate to set the second downlink transmission power for protected subframes PSF (second resources) at a high level.

On the other hand, as shown in FIG. 11, in a case in which there are not many IRC terminals 300 from among user terminals connected with the macro base station 100, the number of the IRC terminals 300 from among user terminals within the pico cells Cp will be small. In a case in which there are not many IRC terminals 300 from among user terminals within the pico cells Cp, if the downlink transmission power of the macro base station 100 is set at a high level, many non-IRC terminals 400 in the pico cells Cp are subject to degraded reception quality due to interference from the macro base station 100. In this case, as shown in FIG. 12, it is appropriate to set the second downlink transmission power for protected subframes PSF (second resources) at a low level. Therefore, the transmission power controller 134 sets the second downlink transmission power for protected subframes PSF (second resources) in such a manner that the greater the proportion of the number of IRC terminals 300 connected with the macro base station 100 to the total number of user terminals connected with the macro base station 100, the higher the second downlink transmission power. Thus, in a radio communication system in which the macro base station 100 (high-power radio base station) and the pico base stations 200 (low-power radio base stations) coordinate with each other for the eICIC, the downlink transmission power at the macro base station 100 can be suitably controlled. In this embodiment, the reporting of the statistical amount, etc., from the pico base stations 200 to the macro base station 100 is not required, and therefore, traffic from the pico base stations 200 to the macro base station 100 and the processing load at these radio base stations are reduced.

In a similar way as in the first embodiment, the transmission power controller 134 may use a table similar to a table such as Table 1 or an equation for setting the second downlink transmission power based on the above statistical proportion.

The transmission power controller 134 of the macro base station 100 periodically calculates the statistical amount with regard to multiple user terminals connected with the macro base station 100, and periodically decides the second downlink transmission power on the basis of the statistical amount. By repeating the decision of the second downlink transmission power in this manner, the second downlink transmission power can always be suitably adjusted.

As described above, in a case in which there are many IRC terminals 300 from among user terminals within the macro cell Cm, the second downlink transmission power for protected subframes PSF (second resources) is set at a high level, so that the downlink transmission efficiency at the macro base station 100 can be enhanced and the user terminals connected with the macro base station 100 can receive signals with high efficiency. The signal reception efficiency at the user terminals connected with the macro base station 100 can be enhanced by setting the second downlink transmission power at a high level in addition to the use of cell range expansion, which contributes to enhancement of signal reception efficiency at the user terminals connected with the macro base station 100.

Seventh Embodiment

In the sixth embodiment, the transmission power controller 134 of the macro base station 100 sets the second downlink transmission power for protected subframes PSF (second resources) based on the proportion of the number of the IRC terminals 300 to the total number of user terminals connected with the macro base station 100. However, in a seventh embodiment, the transmission power controller 134 may set the second downlink transmission power for protected subframes PSF (second resources) based on the traffic amount for the IRC terminals 300 to the total traffic amount for user terminals connected with the macro base station 100.

In the seventh embodiment, the structures of the macro base station 100, the pico base stations 200, and the user terminals (the IRC terminal 300s and the non-IRC terminals 400) may be the same as those according to the sixth embodiment. The features that are the same as in the sixth embodiment will not be described here in detail. However, the following features are different.

The terminal capability determiner 132 (FIG. 13) of the controller 130 of the macro base station 100 determines whether a user terminal is the IRC terminal 300 or the non-IRC terminal 400 based on the terminal capability information UC reported from the user terminal connected with the macro base station 100. Furthermore, the controller 130 of the macro base station 100 monitors the traffic amount with respect to each user terminal connected with the macro base station 100. The controller 130 calculates the total traffic for all user terminals connected with the macro base station 100 and the total traffic for all IRC terminals 300 connected with the macro base station 100. These results of the calculation are conveyed to the transmission power controller 134.

Thus, the total traffic amount for all the user terminals connected with the macro base station 100 and the total traffic amount for all the IRC terminals 300 connected with the macro station 100 are recognized by the transmission power controller 134 of the macro base station 100. The transmission power controller 134 calculates the statistical amount related to interference rejection combining capability of the user terminals connected with the macro base station 100. Specifically, the transmission power controller 134 calculates the proportion of the total traffic amount for all the IRC terminals 300 connected with the macro base station 100 and the total traffic amount for all the user terminals connected with the macro base station 100. The transmission power controller 134 then sets the parameter for eICIC based on this statistical amount. That is to say, the transmission power controller 134 of the macro base station 100 sets the second downlink transmission power for protected subframes PSF (second resources) according to the proportion of the traffic amount for the IRC terminals 300 to the total traffic amount for user terminals connected with the macro base station 100.

The proportion of the traffic amount for the IRC terminals 300 from among the total traffic amount for multiple user terminals connected with the pico base stations 200 is considered to be almost the same as the proportion of the traffic amount for the IRC terminals 300 from among the total traffic amount for multiple user terminals that connect to the macro base station 100. For multiple radio base stations that are very remote from one another, it is difficult to be certain that the statistical values with respect to the IRC terminals 300 at a radio base station will be almost the same as the statistical values with respect to the IRC terminals 300 at another radio base station. However, it is considered that the statistical values with respect to IRC terminals 300 at a radio base station will be almost the same as the statistical values with respect to IRC terminals 300 at another radio base station for multiple radio base stations that are close to one another.

In a case in which the proportion of the traffic amount for the IRC terminals 300 to the total traffic amount for the user terminals connected with the macro base station 100 is large, the proportion for the traffic amount for the IRC terminals 300 to the total traffic amount for the user terminals connected with the pico base stations 200 will be large. In a case in which the proportion of the traffic amount for the IRC terminals 300 connected with the pico base stations 200 to the total traffic amount for the user terminals connected with the pico base stations 200 is large, even if the downlink transmission power of the macro base station 100 is set at a high level, the IRC terminals 300 that are in the pico cells Cp and that use a large amount of traffic can suppress the interference caused by the macro base station 100. In this case, as shown in FIG. 10, it is appropriate to set the second downlink transmission power for protected subframes PSF (second resources) at a high level.

On the other hand, in a case in which the proportion of the traffic amount for the IRC terminals 300 to the total traffic amount for the user terminals connected with the macro base station 100 is small, the proportion of the traffic amount for the IRC terminals 300 to the total traffic amount for the user terminals connected with the pico base stations 200 will be small. In a case in which the proportion of the traffic amount for the IRC terminals 300 connected with the pico base stations 200 to the total traffic amount for the user terminals connected with the pico base stations 200 is small, if the downlink transmission power of the macro base station 100 is set at a high level, the non-IRC terminals 400 that are in the pico cells Cp and using a large amount of traffic are subject to degraded reception quality due to the interference from the macro base station 100. In this case, as shown in FIG. 12, it is appropriate to set the second downlink transmission power for protected subframes PSF (second resources) at a low level. Therefore, the transmission power controller 134 sets the second downlink transmission power for protected subframes PSF (second resources) in such a manner that the larger the proportion of the traffic amount for the IRC terminals 300 connected with the macro base station 100 to the total traffic amount for the user terminals connected with the macro base station 100, the higher the second downlink transmission power. Thus, in a radio communication system in which the macro base station 100 (high-power radio base station) and the pico base stations 200 (low-power radio base stations) coordinate with each other for the eICIC, the quantity of the non-protected subframes NSF can be suitably controlled. In this embodiment, the reporting of the statistical amount, etc., from the pico base stations 200 to the macro base station 100 is not required, and therefore, traffic from the pico base stations 200 to the macro base station 100 and the processing load at these radio base stations are reduced. In comparison with the sixth embodiment, since the second downlink transmission power is set on the basis of the traffic amounts in this embodiment, the second downlink transmission power can be controlled more suitably.

In a similar way as in the first embodiment, the transmission power controller 134 may use a table similar to a table such as Table 1 or an equation for setting the second downlink transmission power based on the above statistical proportion.

Each of the terminal capability information transmitters 332 and 442 of the user terminals periodically reports the terminal capability information to the radio base station to which the user terminal is connected, and the transmission power controller 134 of the macro base station 100 periodically calculates the statistical amount related to interference rejection combining capability of the user terminals connected with the macro base station 100, and periodically decides the second downlink transmission power on the basis of the statistical amount. By repeating the decision of the second downlink transmission power in this manner, the second downlink transmission power can always be suitably adjusted.

As described above, in a case in which the downlink traffic amount for the IRC terminals 300 from among user terminals within the macro cell Cm is large, the second downlink transmission power for protected subframes PSF (second resources) is set at a high level, so that the downlink transmission efficiency at the macro base station 100 can be enhanced and the user terminals connected with the macro base station 100 can receive signals with high efficiency. The signal reception efficiency at the user terminals connected with the macro base station 100 can be enhanced by setting the second downlink transmission power at a high level in addition to the use of cell range expansion, which contributes to enhancement of signal reception efficiency at the user terminals connected with the macro base station 100.

An example of the above-described traffic amount may be the transmission rate of downlink data received by each user terminal connected with the macro base station 100, and an example of the total traffic amount may be the sum of the transmission rates of downlink data received by all user terminals connected with the macro base station 100. Alternatively, an example of the above-described traffic amount may be the amount of data temporally stored in macro base station 100 for transmission to each user terminal, and an example of the total traffic amount may be the sum of the amounts of data temporally stored in the macro base station 100 for transmission to all user terminals. Alternatively, an example of the above-described traffic amount may be the number of calls received by each user terminal connected with the macro base station 100, and an example of the total traffic amount may be the sum of the number of calls received by all user terminals connected with the macro base station 100.

Eighth Embodiment

In an eighth embodiment, instead of the proportion of the traffic amount in the seventh embodiment, the number of downlink resource blocks allocated by the macro base station 100 to the IRC terminals 300 connected with the macro base station 100 may be used. This embodiment is premised on an estimation in which the number of downlink resource blocks for the IRC terminals 300 connected with the pico base stations 200 is almost the same as the number of downlink resource blocks for the IRC terminals 300 connected with the macro base station 100.

In the eighth embodiment, the structures of the macro base station 100, the pico base stations 200, and the user terminals (the IRC terminal 300s and the non-IRC terminals 400) may be the same as those according to the sixth embodiment. The features that are the same as in the sixth embodiment will not be described here in detail. However, the following features are different.

The controller 130 of the macro base station 100 counts the number of downlink resource blocks allocated by the macro base station 100 to the IRC terminals 300 connected with the macro base station 100.

The transmission power controller 134 sets the second downlink transmission power for protected subframes PSF (second resources) on the basis of the counted value, i.e., the number of downlink resource blocks for the IRC terminals 300. In a case in which the number of downlink resource blocks for the IRC terminals 300 is great, the transmission power controller 134 sets the downlink transmission power of the macro base station 100 at a high lever. In a case in which the number of downlink resource blocks for the IRC terminals 300 is small, the transmission power controller 134 sets the downlink transmission power of the macro base station 100 at a low level. Thus, it is possible to suitably control the second downlink transmission power for restricting interference to multiple user terminals connected with the pico base stations 200. In comparison with the sixth embodiment, since the second downlink transmission power is set on the basis of the number of resource blocks actually used in this embodiment, the second downlink transmission power can be controlled more suitably. In addition, since the number of downlink resource blocks allocated by the macro base station 100 to the IRC terminals 300 can be precisely and easily recognized by the macro base station 1000, the second downlink transmission power can be controlled more suitably and easily.

The transmission power controller 134 may use a table similar to a table such as Table 1 or an equation for setting the second downlink transmission power based the number of downlink resource blocks for the IRC terminals 300.

The controller 130 of the macro base station 100 may calculate the proportion of the counted value to the number of all resource blocks available for downlink communication at the macro base station 100. However, since the number of all resource blocks available for downlink communication at the macro base station 100 is unchanged and constant, the above-mentioned counted value is equivalent to this proportion, so that it is not always necessary to calculate the proportion.

The controller 130 of the macro base station 100 periodically counts the number of downlink resource blocks allocated to IRC terminals 300 connected with the macro base station 100, and the transmission power controller 134 of the macro base station 100 periodically decides the second downlink transmission power on the basis of the counted value. By repeating the decision of the second downlink transmission power in this manner, the second downlink transmission power can always be suitably adjusted.

As described above, in a case in which the number of downlink resource blocks for the IRC terminals 300 from among user terminals within the macro cell Cm is large, the second downlink transmission power for protected subframes PSF (second resources) is set at a high level, so that the downlink transmission efficiency at the macro base station 100 can be enhanced and the user terminals connected with the macro base station 100 can receive signals at a high efficiency. The signal reception efficiency at the user terminals connected with the macro base station 100 can be enhanced by setting the second downlink transmission power at a high level in addition to the use of cell range expansion, which contributes to enhancement of signal reception efficiency at the user terminals connected with the macro base station 100.

Other Modifications

Modification 1

In the first to fourth embodiments, the transmission power controller 134 of the macro base station 100 may adjust the second downlink transmission power (downlink transmission power at protected subframes) taking account of respective levels of interference rejection combining capability of the user terminals (types of interference rejection combining) connected with the pico base station 200.

The IRC terminals 300 can be categorized into, for example, the following three types:

1) a mobile terminal that blind estimates interference signal components using only channel estimation results of the desired signal from the base station with which the mobile terminal is connected and that rejects the interference power based on the estimated interference signal components;

the IRC receiver described in Non-Patent Document 3 falls under this type and executes the IRC even in a case in which the channel estimation of the interference signal cannot be performed.

2) a mobile terminal that suppresses the interference power by utilizing channel estimation results of an interference signal from an interfering base station;

this mobile terminal is capable of channel estimation of an interference signal; and 3) a terminal that executes Successive Interference Cancellation (SIC).

The receiver described in Non-Patent Document 4 is of this type. In the SIC, a mobile terminal obtains a desired signal for the mobile terminal by demodulating an interference signal (it is further decoded in some cases), and subtracting the interference signal from the received signal consecutively.

Type 3 has the highest interference rejection combining capability. Type 1 has the lowest interference rejection combining capability.

The terminal capability information transmitter 432 of each non-IRC terminal 400 transmits terminal capability information indicating that the user terminal is a non-IRC terminal to the radio base station (the macro base station 100 or the pico base station 200) to which the user terminal is connected. The terminal capability information transmitter 332 of each IRC terminal 300 transmits terminal capability information corresponding to the interference rejection combining capability of the IRC terminal itself to the radio base station (the macro base station 100 or the pico base station 200) to which the IRC terminal is connected.

For example, the terminal capability information may be 2-bit information as exemplified in Table 2. It is to be noted that the capability information of non-IRC terminals may not have to be notified and that a terminal for which no capability information is notified can be regarded as a non-IRC terminal.

TABLE 2

| Type of User Terminal | Terminal Capability Information |
|---|---|
| Non-IRC Terminal | 00 |
| IRC Terminal of Type 1 | 01 |
| IRC Terminal of Type 2 | 10 |
| IRC Terminal of Type 3 | 11 |

As a variation of the first embodiment, the terminal capability determiner 232 of the controller 230 of the pico base station 200 reports the terminal capability information of each user terminal to the macro base station 100 by means of the inter-base station communicator 220. The terminal capability information of all user terminals connected with the pico base stations 200 existing in the cell of the macro base station 100 are recognized by the transmission power controller 134 of the macro base station 100. The transmission power controller 134 can give, to each of the IRC terminals 300 connected with the pico base stations 200, a weight corresponding to the interference rejection combining capability level (interference rejection combining type) of each IRC terminal 300 and can additionally calculate the proportion X of the number of the IRC terminals 300 to the total number of the user terminals connected with the pico base stations 200. Specifically, the proportion X is calculated in accordance with following equation (1):

$$X = \frac{aN_{p1} + bN_{p2} + cN_{p3}}{N_{p0} + aN_{p1} + bN_{p2} + cN_{p3}} \qquad (1)$$

where $N_{p0}$ is the number of the non-IRC terminals 400 connected with the pico base stations 200, $N_{p1}$ is the number of the IRC terminals 300 of Type 1 connected with the pico base stations 200, $N_{p2}$ is the number of the IRC terminals 300 of Type 2 connected with the pico base stations 200, and $N_{p3}$ is the number of the IRC terminals 300 of Type 3 connected with the pico base stations 200. In the above, a, b, and c are weighting factors, where $1 \leq a < b < c$.

The transmission power controller 134 then sets the second downlink transmission power for protected subframes PSF (second resources) in such a manner that the greater the proportion X, the higher the second downlink transmission power. The transmission power controller 134 may use a table similar to a table such as Table 1 or an equation for setting the second downlink transmission power.

As a variation of the second embodiment, the controller 230 of the pico base station 200 may calculate the proportion X in accordance with equation (1) and may report the proportion X to macro base station 100, and the transmission power controller 134 of the macro base station 100 may set the second downlink transmission power on the basis of the proportion X. In a case in which there are multiple pico base stations 200 in the macro cell Cm of the macro base station 100, in a similar way as in the second embodiment, the transmission power controller 134 may calculate or seek the average value, the median value, the minimum value, or the maximum value of the proportions X reported from multiple pico base stations 200, and may set the second downlink transmission power on the basis of the calculated or sought value.

As a variation of the third embodiment, the terminal capability determiner 232 of the controller 230 of the pico base station 200 reports the terminal capability information of each user terminal to the macro base station 100 by means of the inter-base station communicator 220. The terminal capability information of all user terminals connected with the pico base stations 200 located within the cell of the macro base station 100 is recognized by the transmission power controller 134 of the macro base station 100. The transmission power controller 134 can give, to each of the IRC terminals 300 connected with the pico base stations 200, a weight corresponding to the interference rejection combining capability level (interference rejection combining type) of each IRC terminal 300 and can additionally calculate the proportion $X_T$ of the traffic amount for the IRC terminals 300 to the total traffic amount for the user terminals connected with the pico base stations 200. Specifically, the proportion $X_T$ is calculated in accordance with following equation (2):

$$X_T = \frac{aT_{p1} + bT_{p2} + cT_{p3}}{T_{p0} + aT_{p1} + bT_{p2} + cT_{p3}} \qquad (2)$$

where $T_{p0}$ is the traffic of the non-IRC terminals 400 connected with the pico base stations 200, $T_{p1}$ is the traffic of the IRC terminals 300 of Type 1 connected with the pico base stations 200, $T_{p2}$ is the traffic of the IRC terminals 300 of Type 2 connected with the pico base stations 200, and $T_{p3}$ is the traffic of the IRC terminals 300 of Type 3 connected with the pico base stations 200. In the above, a, b, and c are weighting factors, where $1 \leq a < b < c$.

The transmission power controller 134 then sets the second downlink transmission power for protected subframes PSF (second resources) in such a manner that the greater the proportion $X_T$, the higher the second downlink transmission power. The transmission power controller 134 may use a table similar to a table such as Table 1 or an equation for setting the second downlink transmission power.

As a variation of the fourth embodiment, the controller 230 of the pico base station 200 may calculate the proportion $X_T$ in accordance with equation (2) and may report the proportion $X_T$ to the macro base station 100, and the transmission power controller 134 of the macro base station 100 may set the second downlink transmission power on the basis of the proportion $X_T$. In a case in which there are multiple pico base stations 200 in the macro cell Cm of the macro base station 100, in a similar way as in the fourth embodiment, the transmission power controller 134 may calculate or seek the average value, the median value, the minimum value, or the maximum value of the proportions $X_T$ reported from multiple pico base stations 200, and may set the second downlink transmission power on the basis of the calculated or sought value.

In this modification, the transmission power controller 134 of the macro base station 100 adjusts the second downlink transmission power (downlink transmission power at protected subframes) taking account of respective levels of interference rejection combining of multiple IRC terminals 300 connected with the pico base stations 200. In a case in which there are many IRC terminals 300 having high interference rejection combining capability within the pico cells Cp, even if the macro base station 100 sets the downlink transmission power at a high level, the many IRC terminals 300 in the pico cells Cp can suppress the interference caused by the macro base station 100. Therefore, as described above, by giving a weight to each of the IRC terminals 300 connected with the pico base stations 200, with the weight corresponding to the interference rejection combining capability level (interference rejection combining type) of each IRC terminal 300, the second downlink transmission power can be suitably set.

Modification 2

In the sixth and seventh embodiments, the transmission power controller 134 of the macro base station 100 may adjust the second downlink transmission power (downlink transmission power at protected subframes) taking account of the respective levels of interference rejection combining (types of interference rejection combining) of multiple user terminals connected with the macro base station 100.

Like in modification 1, each user terminal reports terminal capability information to the radio base station (the macro base station 100 or the pico base station 200) to which the user terminal is connected. Thus, terminal capability information of all user terminals connected with the macro base station 100 is recognized by the transmission power controller 134 of the macro base station 100. As a variation of the sixth embodiment, the transmission power controller 134 can give, to each of the IRC terminals 300 connected with the macro base station 100, a weight corresponding to the interference rejection combining capability (interference rejection combining type) of each IRC terminal 300 and can additionally calculate the proportion $X_m$ of the number of the IRC terminals 300 to the total number of user terminals connected with the macro base station 100. Specifically, the proportion $X_m$ is calculated in accordance with following equation (3).

$$X_m = \frac{aN_{m1} + bN_{m2} + cN_{m3}}{N_{m0} + aN_{m1} + bN_{m2} + cN_{m3}} \quad (3)$$

where $N_{m0}$ is the number of the non-IRC terminals 400 connected with the macro base station 100, $N_{m1}$ is the number of the IRC terminals 300 of Type 1 connected with the macro base station 100, $N_{m2}$ is the number of the IRC terminals 300 of Type 2 connected with the macro base station 100, and $N_{m3}$ is the number of the IRC terminals 300 of Type 3 connected with the macro base station 100. In the above, a, b, and c are weighting factors, where $1 \le a < b < c$.

The transmission power controller 134 then sets the second downlink transmission power for protected subframes PSF (second resources) in such a manner that the greater the proportion $X_m$, the higher the second downlink transmission power. The transmission power controller 134 may use a table similar to a table such as Table 1 or an equation for setting the second downlink transmission power.

As a variation of the seventh embodiment, transmission power controller 134 can give, to each of the IRC terminals 300 connected with the macro base station 100, a weight corresponding to the interference rejection combining capability (interference rejection combining type) of each IRC terminal 300 and can additionally calculate the proportion $X_{mT}$ of the traffic amount for the IRC terminals 300 to the total traffic amount for the user terminals connected with the macro base station 100. Specifically, the proportion $X_{mT}$ is calculated in accordance with following equation (4).

$$X_{mT} = \frac{aT_{m1} + bT_{m2} + cT_{m3}}{T_{m0} + aT_{m1} + bT_{m2} + cT_{m3}} \quad (4)$$

where $T_{m0}$ is the traffic amount for non-IRC terminals 400 connected with the macro base station 100, $T_{m1}$ is the traffic amount for the IRC terminals 300 of Type 1 connected with the macro base station 100, $T_{m2}$ is the traffic amount for the IRC terminals 300 of Type 2 connected with the macro base station 100, and $T_{m3}$ is the traffic amount for the IRC terminals 300 of Type 3 connected with the macro base station 100. In the above, a, b, and c are weighting factors, where $1 \le a < b < c$.

The transmission power controller 134 then sets the second downlink transmission power for protected subframes PSF (second resources) in such a manner that the greater the proportion $X_{mT}$, the higher the second downlink transmission power. The transmission power controller 134 may use a table similar to a table such as Table 1 or an equation for setting the second downlink transmission power.

In this modification, the transmission power controller 134 of the macro base station 100 adjusts the second downlink transmission power (downlink transmission power at protected subframes) taking account of the respective levels of interference rejection combining (types of interference rejection combining) of multiple IRC terminals 300 connected with the macro base station 100. In a case in which there are many IRC terminals 300 having high interference rejection combining capability within the macro cell Cm, it is considered that there will be many IRC terminals 300 having high interference rejection combining capability within the pico cells Cp. In a case in which there are many IRC terminals 300 having high interference rejection combining capability within the pico cells Cp, even if the macro base station 100 sets the downlink transmission power at a high level, the many IRC terminals 300 in the pico cells Cp can suppress the interference caused by the macro base station 100. Therefore, as described above, by giving a weight to each of the IRC terminals 300 connected with the macro base station 100, with the weighting corresponding to the interference rejection combining capability (interference rejection combining type) of each IRC terminal 300, the second downlink transmission power can be suitably set.

Modification 3

Figure 15:
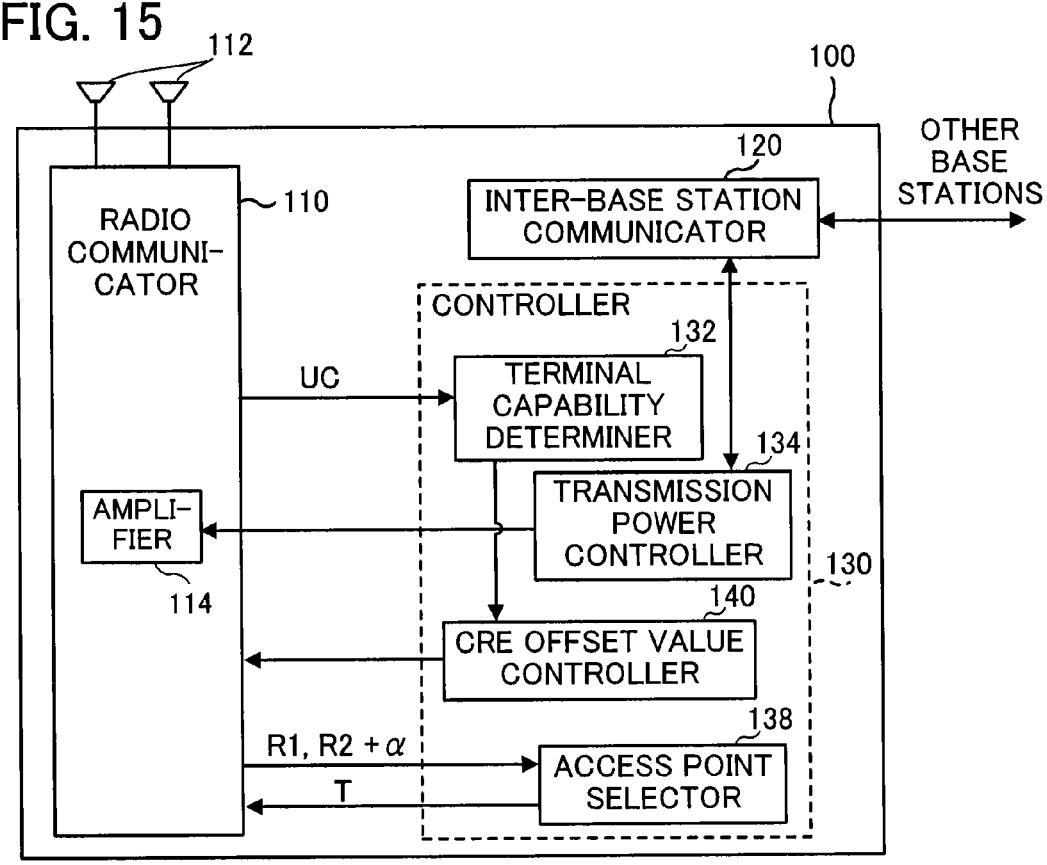
FIG. 15 is a block diagram showing the configuration of a macro base station according to a modification of the present invention.
Figure 16:
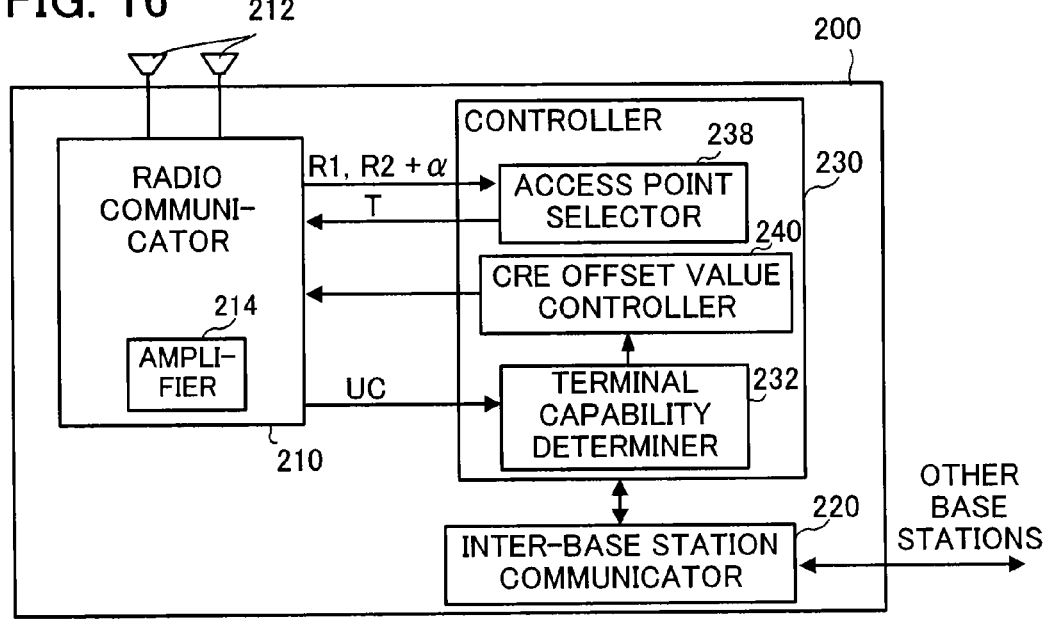
FIG. 16 is a block diagram showing the configuration of a pico base station according to a modification of the present invention.

FIG. 15 is a block diagram showing the structure of a macro base station 100 according to a modification of the present invention. In this modification, the controller 130 of the macro base station 100 includes a cell range expansion (CRE) offset value controller 140. FIG. 16 is a block diagram showing the structure of a pico base station 200 according to the modification of the present invention. In this modification, the controller 230 of the pico base station 200 includes a cell range expansion (CRE) offset value controller 240. In a manner similar to modification 1, each user terminal reports the terminal capability information to the radio base station (macro base station 100 or pico base station 200) with which the user terminal is connected. The terminal capability information may be 2-bit information as exemplified in Table 2. It is to be noted that the capability information of non-IRC terminals may not have to be notified and that a terminal for which no capability information is notified can be regarded as a non-IRC terminal.

In a case in which the desired radio base station for a user terminal is the macro base station 100, the signal indicating the terminal capability information is received at the radio communicator 110 of the macro base station 100. The terminal capability determiner 132 of the controller 130 of the macro base station 100 determines the interference rejection combining level (interference rejection combining type) based on the terminal capability information reported from the user terminal, and the CRE offset value controller 140 controls the CRE offset value for the user terminal on the basis of the interference rejection combining level of the user terminal. In a case in which the desired radio base station for the user terminal is the pico base station 200, the signal indicating the terminal capability information is received at the radio communicator 210 of the pico base station 200. The terminal capability determiner 232 of the controller 230 of the pico base station 200 determines the interference rejection combining level (interference rejection combining type) based on the terminal capability information reported from the user terminal, and the CRE offset value controller 240 controls the CRE offset value for the user terminal on the basis of the interference rejection combining level of the user terminal.

The CRE offset value is an offset value used by each user terminal for modifying the reception quality or reception power from the pico base station 200. For example, each of the reception quality modifiers 336 of the IRC terminals 300 and the reception quality modifier 436 of the non-IRC terminals 400 increases the second reception power value R2 of radio waves from the pico base station 200 with the use of the CRE offset value $\alpha$. In contrast to the first embodiment, the CRE offset value $\alpha$ is variable in this modification. In a manner similar to the first embodiment, the second reception power value R2 modified by the offset value $\alpha$ is used by the access point selector 138 of the macro base station 100 and the access point selector 238 of the pico base station 200 to determine the access point for the user terminal.

The CRE offset value controller 140 or 240 controls the CRE offset value $\alpha$ for a user terminal in such a manner that the lower the level of interference rejection combining capability of the user terminal, the lower the degree of enhancement for the reception quality or reception power from the pico base station 200 by the CRE offset value $\alpha$. For example, the CRE offset value controller 140 or 240 may use a table such as Table 3 for controlling the CRE offset value $\alpha$. This table can be stored in a storage unit (not shown) of the macro base station 100 or the pico base station 200.

TABLE 3

| Terminal Capability Information | CRE offset value $\alpha$ |
|---|---|
| 00 | $\alpha_1$ |
| 01 | $\alpha_2$ |
| 10 | $\alpha_3$ |
| 11 | $\alpha_4$ |

In Table 3, $\alpha_1 < \alpha_2 < \alpha_3 < \alpha_4$. The lowest offset value $\alpha_1$ is given to the non-IRC terminals 400 (identified by terminal capability information "00"), whereas the highest offset value $\alpha_4$ is given to the the IRC terminals 300 of Type 3 having the highest interference rejection combining capability (identified by terminal capability information "11"). Therefore, the reception quality or reception power from the pico base station 200 at the non-IRC terminals 400 is not significantly increased, so that the non-IRC terminals 400 are likely to be connected with the macro base station 100 in comparison with the IRC terminals 300. The reception quality or reception power from the pico base station 200 at the IRC terminals 300 of Type 3 is significantly increased, so that the IRC terminals 300 of Type 3 are likely to be connected with the pico base stations 200 in comparison with other user terminals.

After determination of the CRE offset value $\alpha$ of a user terminal, the CRE offset value controller 140 or 240 transmits information indicating the CRE offset value $\alpha$ to the user terminal with the use of the radio communicator 110 or 210. For transmission of this information, for example, the downlink control channel may be used. Upon reception of this information, the user terminal modifies the reception quality or reception power from the pico base station 200 with the use of the CRE offset value $\alpha$. It is not necessary that the macro base station 100 and the pico base station 200 include the CRE offset value controller 140 and 240, respectively, and either of the macro base station 100 and the pico base station 200 may include a CRE offset value controller.

In the present invention, the second downlink transmission power for protected subframes PSF (second resources) of the macro base station 100 is adjusted. According to circumstances, there is concern that a significant degree of interference will be caused at user terminals having a low interference rejection combining capability connected to the pico base stations 200, especially, the non-IRC terminals 400, as a result of increasing the second downlink transmission power of the macro base station 100. In this modification, CRE offset values a of user terminals are controlled in accordance with the level of interference rejection combining, so that the user terminal having a low level of interference rejection combining is likely to be connected with the macro base station 100. Since the user terminal having a low level of interference rejection combining is not likely to be connected with the pico base stations 200, it is possible to decrease occasions in which the user terminal having a low level of interference rejection combining is subject to significant interference from the macro base station 100 even if the second downlink transmission power at the macro base station 100 is increased. This modification may be applied to any of the above-described embodiments.

Modification 4

The above-described embodiments are based on the time domain-based eICIC, and the transmission power controller 134 of the macro base station 100 sets the second downlink transmission power at protected subframes PSF (second resources) in accordance with a statistical value. However, the frequency domain-based eICIC may be used instead of the time domain-based eICIC. In other words, the transmission power controller 134 may set the second downlink transmission power at protected subframes PSF (second resources) in accordance with a statistical value. This modification may be applied to any of the above-described embodiments.

Figure 17:
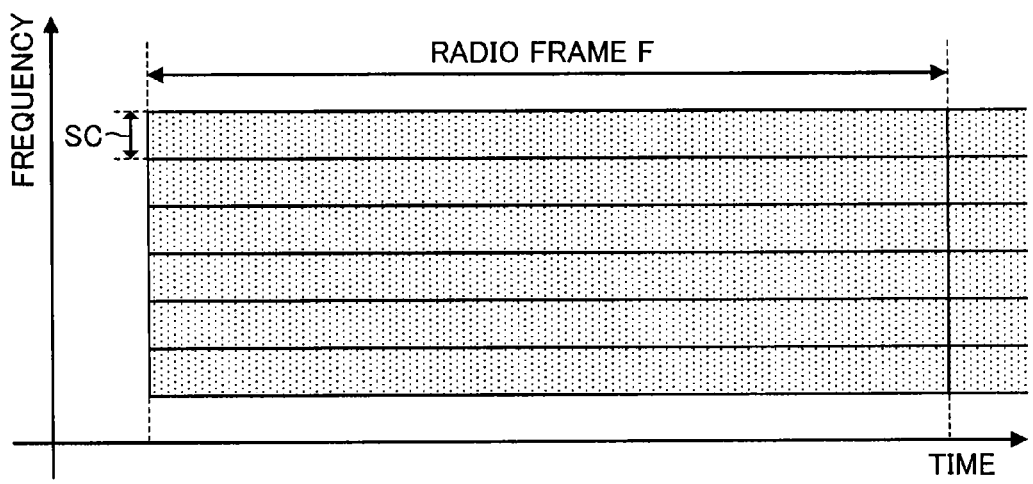
FIG. 17 is a view showing a format of the radio frame exchanged by communication elements in the radio communication system.

FIG. 17 is a view showing a format of the radio frame F exchanged by communication elements in the radio communication system from a standpoint different from FIG. 7. As described above, the radio frame F occupies a predetermined time length and a predetermined bandwidth. The radio frame F includes multiple subcarriers SC along the frequency direction. Each subcarrier SC is a transmission unit occupying a frequency band (for example, 15 kHz) that is narrower than that of the radio frame F. Only six subcarriers SC are illustrated, but it will be appreciated that any number of subcarriers SC may be included in the radio frame F. In order to illustrate that multiple subcarriers SC are mutually orthogonal in the frequency domain, FIG. 17 shows that subcarriers SC do not overlap one on another. In fact, subcarriers SC (in particular, subcarriers SC of which the center frequencies are adjacent) may overlap at least partially.

Although FIG. 17 does not explicitly show subframes SF, in contrast to FIG. 7, this is not intended to mean that the radio frame F lacks subframes SF. FIG. 17 is a view in which subcarriers SC that are transmission units in the frequency domain are emphasized, and illustration of subframes SF is omitted.

Figure 18:
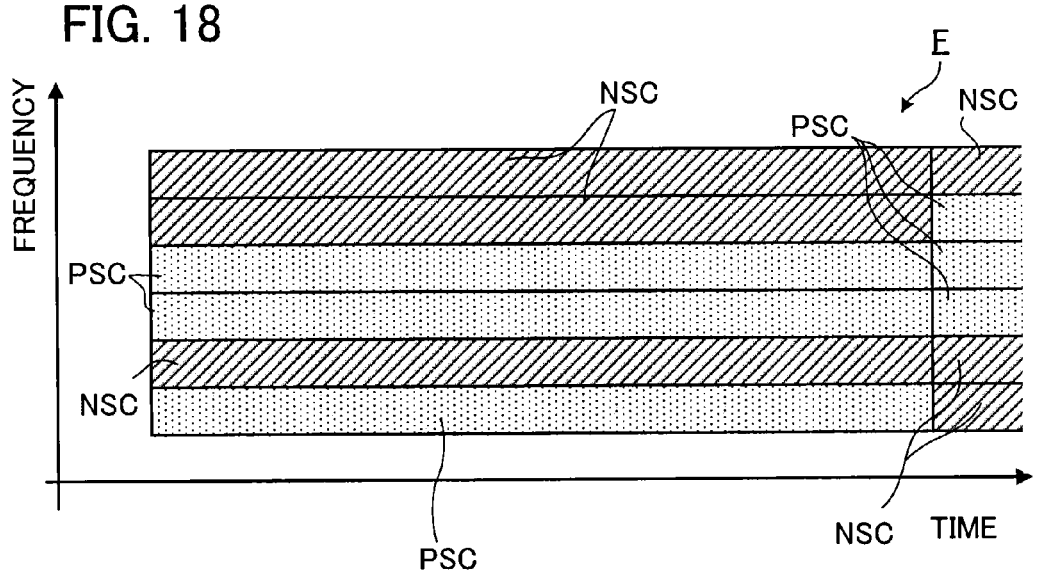
FIG. 18 is a schematic view showing frequency domain-based inter-cell interference control.

FIG. 18 is a schematic view for showing frequency domain-based eICIC. The macro base station 100 executes downlink transmission at the maximum transmission power or a power close to the maximum transmission power at certain subcarriers SC, but executes downlink transmission at a very low transmission power at other subcarriers SC. The subcarrier SC at which the macro base station 100 executes downlink transmission at a lower transmission power (second downlink transmission power) is called a protected subcarrier PSC since the radio signal from the pico base station 200 is protected from interference by the macro base station 100. On the other hand, the subcarrier SC at which the macro base station 100 executes downlink transmission at a higher transmission power (first downlink transmission power) is called a non-protected subcarrier NSC. On the other hand, the pico base station 200 executes downlink transmission at a constant transmission power at all subcarriers SC. That is to say, the pico base station 200 can send radio signals at a common transmission power at both of non-protected subcarriers NSC and protected subcarriers PSC.

At protected subcarriers PSC, at which the radio communicator 110 of the macro base station 100 executes downlink transmission at a lower transmission power, the radio signal from the pico base station 200 is less likely to be interfered with by the radio signal from the macro base station 100, so that the mobile terminals 300 visiting the pico cell Cp defined by the pico base station 200 can receive the radio signals from the pico base station 200 of good quality.

In this modification radio communication system based on the frequency domain-based eICIC, the transmission power controller 134 of the macro base station 100 causes the radio communicator 110 to operate at the higher transmission power (first downlink transmission power) at non-protected subcarriers NSC (first resources) included in a unit resource (radio frame F) that occupies a predetermined time length and a predetermined frequency bandwidth, and causes the radio communicator 110 to operate at the second downlink transmission power, which is lower than the first downlink transmission power, at protected subcarriers PSC (second resources) in the unit resource. The transmission power controller 134 may adjust, i.e., set the downlink transmission power at the protected subcarriers PSC (second downlink transmission power) in the radio frame F in accordance with the above-mentioned statistical value.

In a case in which there are many IRC terminals 300 among the total number of user terminals, in a case in which there is a large amount of traffic for IRC terminals 300 among the total downlink traffic amount for user terminals, or in a case in which there are many downlink resource blocks for IRC terminals 300, even if the macro base station 100 sets the downlink transmission power to a high level, many IRC terminals 300 located in the pico cell Cp can suppress interference from the macro base station 100. In this situation, it is suitable for the second downlink transmission power for protected subcarriers PSC (second resources) to be set to a high level.

On the other hand, in a case in which there are few IRC terminals 300 among the total number of user terminals, in a case in which there is a lower amount of traffic for IRC terminals 300 among the total downlink traffic amount for user terminals, or in a case in which there are few downlink resource blocks for IRC terminals 300, if the downlink transmission power of the high-power base station is set to a high level, reception qualities at many IRC terminals 300 located in the pico cell Cp are likely to be lowered by interference from the macro base station 100. In this situation, it is suitable for the second downlink transmission power to be set to a low level. A table similar to a table such as Table 1 or an equation may be used for setting the second downlink transmission power.

In the above description of a modification, subcarriers are exemplified as frequency bands. However, carrier frequencies (carriers) may be used for frequency bands. In other words, the macro base station may execute downlink transmission at a higher transmission power at some carrier frequencies (first resources) and may execute downlink transmission at a lower transmission power at other carrier frequencies (second resources), whereas the pico base station may execute downlink transmission at a common transmission power at both carrier frequencies.

Modification 5

Resource block-based eICIC may be utilized. In other words, the transmission power controller 134 may set the downlink transmission power at the protected resource blocks depending on the statistical value. This modification may be applied to any of the above-described embodiments.

Figure 19:
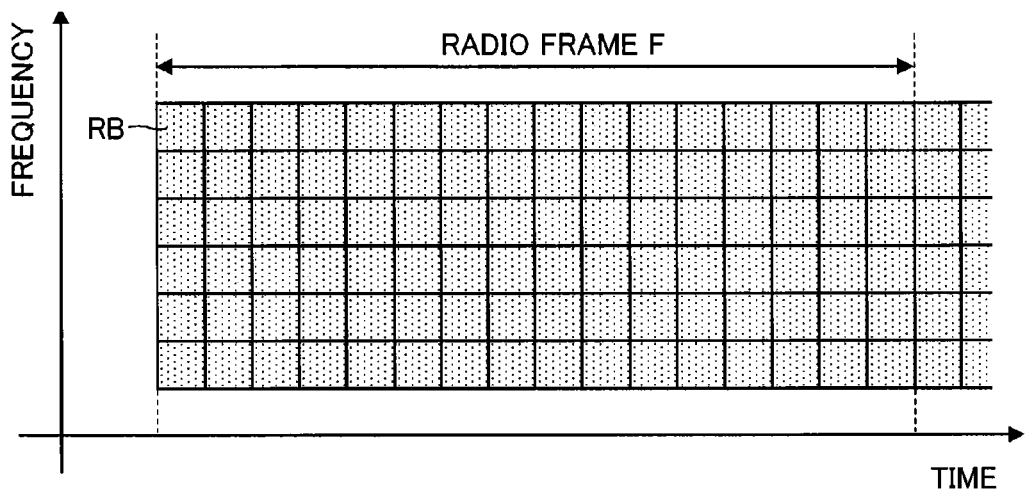
FIG. 19 is a view showing a format of the radio frame exchanged by communication elements in the radio communication system.

FIG. 19 is a view showing a format of the radio frame F exchanged by communication elements in the radio communication system from a standpoint different from FIGS. 7 and 17. As described above, the radio frame F occupies a predetermined time length and a predetermined bandwidth. The radio frame F includes multiple resource blocks RB. Each resource block RB is a transmission unit occupying a time length (for example, 1 millisecond) that is shorter than that of the radio frame F and a frequency band (for example, 180 kHz) that is narrower than that of the radio frame F. Only 96 resource blocks RB are illustrated per radio frame F, but it will be appreciated that any number of resource blocks RB may be included in the radio frame F. Although not illustrated, each resource block RB includes multiple resource elements that are smaller transmission units.

Although FIG. 19 does not explicitly show subframes SF, in contrast to FIG. 7, and does not explicitly show subcarriers SC in contrast to FIG. 17, it is not intended to mean that the radio frame F lacks subframes SF or subcarriers SC. FIG. 19 is a view in which resource blocks RB that are transmission units having a predetermined time length and a predetermined frequency band are emphasized, and illustration of subframes SF and subcarriers SC is omitted.

Figure 20:
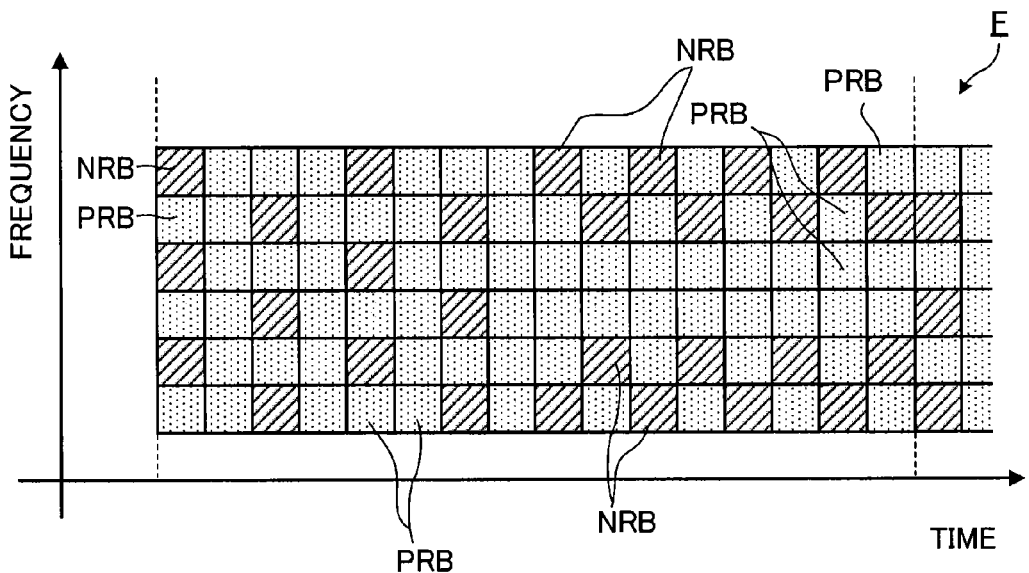
FIG. 20 is is a schematic view for showing resource block-based inter-cell interference control.

FIG. 20 is a schematic view for showing resource block-based eICIC. The macro base station 100 executes downlink transmission at the maximum transmission power or a power close to the maximum transmission power at certain resource blocks RB, but executes downlink transmission at a very low transmission power at other resource blocks RB. The resource block RB at which the macro base station 100 executes downlink transmission at a lower transmission power (second downlink transmission power) is called a protected resource block PRB since the radio signal from the pico base station 200 is protected from interference by the macro base station 100. On the other hand, the resource block RB at which the macro base station 100 executes downlink transmission at a higher transmission power (first downlink transmission power) is called a non-protected resource block NRB. On the other hand, the pico base station 200 executes downlink transmission at a constant transmission power at all resource blocks RB. That is to say, the pico base station 200 can send radio signals at a common transmission power at both of non-protected resource blocks NRB and protected resource blocks PRB.

At the protected resource blocks PRB at which the radio communicator 110 of the macro base station 100 executes downlink transmission at the lower transmission power, only the radio communicator 210 of the pico base station 200 transmits the radio signal. Thus, at the protected resource blocks PRB, the radio signal from the pico base station 200 is not subject to interference by the radio signals from the macro base station 100, so that the mobile terminals 300 visiting the pico cell Cp defined by the pico base station 200 can receive the radio signals from the pico base station 200 of good quality.

In this modification radio communication system based on the frequency domain-based eICIC, the transmission power controller 134 of the macro base station 100 causes the radio communicator 110 to operate at the higher transmission power (first downlink transmission power) at non-protected resource blocks NRB (first resources) included in a unit resource (radio frame F) that occupies a predetermined time length and a predetermined frequency bandwidth, and causes the radio communicator 110 to operate at the second downlink transmission power, which is lower than the first downlink transmission power, at protected resource blocks PRB (second resources) in the unit resource. The transmission power controller 134 may adjust, i.e., set the downlink transmission power at the protected resource blocks PRB (second downlink transmission power) in the radio frame F in accordance with the above-mentioned statistical value.

In a case in which there are many IRC terminals 300 among the total number of user terminals, in a case in which there is a large amount of traffic for IRC terminals 300 among the total downlink traffic amount for user terminals, or in a case in which there are many downlink resource blocks for IRC terminals 300, even if the macro base station 100 sets the downlink transmission power to a high level, many IRC terminals 300 located in the pico cell Cp can suppress interference from the macro base station 100. In this situation, it is suitable for the second downlink transmission power for protected resource blocks PRB (second resources) to be set to a high level.

On the other hand, in a case in which there are few IRC terminals 300 among the total number of user terminals, in a case in which there is a smaller amount of traffic for IRC terminals 300 among the total downlink traffic amount for user terminals, or in a case in which there are few downlink resource blocks for IRC terminals 300, if the downlink transmission power of the high-power base station is set to a high level, reception qualities at many IRC terminals 300 located in the pico cell Cp are likely to be reduced for interference from the macro base station 100. In this situation, it is suitable for the second downlink transmission power to be set to a low level. A table similar to a table such as Table 1 or an equation may be used for setting the second downlink transmission power.

Modification 6

The transmission power controller 134 of the macro base station 100 sets the second downlink transmission power for protected subframes PSF (second resources) on the basis of the statistical value at the pico base stations 200 in the first to fifth embodiments, whereas the transmission power controller 134 of the macro base station 100 sets the second downlink transmission power on the basis of the statistical value at the macro base station 100 in the sixth to eighth embodiments. However, the controller 130 of the macro base station 100 may calculate a statistical value with regard to all user terminals within the macro cell Cm including the macro base station 100 and the pico base stations 200, and the transmission power controller 134 may set the second downlink transmission power on the basis of this statistical value. In this case, in a manner similar to modifications 1 and 2, the transmission power controller 134 may set the second downlink transmission power, taking account of the respective levels of interference rejection combining of user terminals.

Modification 7

In the above-described embodiments, the transmission power controller 134 sets the second downlink transmission power in accordance with the proportion of the number of the IRC terminals 300 to the total number of the user terminals, the proportion of the traffic amount for the IRC terminals 300 to the total downlink traffic for the user terminals, or the number of downlink resource blocks for the IRC terminals 300. The transmission power controller 134 may additionally consider various parameters in setting the second downlink transmission power. The various parameters include, for example, the total number of user terminals radio connected with the pico base stations 200 or to the macro base station 100, the total traffic amount for user terminals wirelessly connected with the pico base stations 200 or with the macro base station 100, the total number of the IRC terminals 300 wirelessly connected with the pico base stations 200 or with the macro base station 100, the total traffic amount for the IRC terminals 300 wirelessly connected with the pico base stations 200 or with the macro base station 100, the total number of the non-IRC terminals 400 wirelessly connected with the pico base stations 200 or with the macro base station 100, the total traffic amount for the non-IRC terminals 400 wirelessly connected with the pico base stations 200 or with the macro base station 100, or the proportion of the first resources to the second resources, or any combination thereof Modification 8

The macro base station 100 may set the proportion of the first resources to the second resources in accordance with the proportion of the number of the IRC terminals 300 to the total number of the user terminals, the proportion of the traffic amount for the IRC terminals 300 to the total downlink traffic for the user terminals, or the number of downlink resource blocks for the IRC terminals 300. The proportion of the first resources to the second resources is, for example, the proportion of the number of non-protected subframes NSF to the number of protected subframes PSF, the proportion of the number of non-protected subcarriers NSC to the number of protected subcarriers PSC, or the proportion of the number of non-protected resource blocks NRB to the number of protected resource blocks PRB.

Modification 9

In the above-described embodiments, the reception characteristic of radio waves measured by the reception quality measurer 334 or 434 of the user terminal is the reference signal received power (RSRP), but it may be the signal-to-interference and noise ratio (SINR), the reference signal reception quality (RSRQ), etc. The reception quality modifier 336 or 436 of each user terminal may modify to increase other reception characteristics from the pico base station 200, instead of the reception power value from the pico base station 200, with the use of the CRE offset value α.

Modification 10

In the above-described embodiments, the reception characteristics of radio waves from the pico base stations 200 are modified by the use of the CRE offset value (bias value) a for CRE. The reception characteristics of radio waves from the macro base station 100 or the pico base stations 200 may further be modified by another offset value (bias value) for other purposes. For example, a hysteresis offset value may be used for preventing user terminals from being handed over to the originally serving radio base stations directly after handover.

Modification 11

In the above-described embodiments, the reception quality reporter 338 or 438 of the user terminal reports the reception quality and the modified reception quality from multiple radio base stations to the desired radio base station, and the access point selector 138 of the macro base station 100 and the access point selectors 238 of the pico base stations 200 select the radio base station to which the user terminal should be connected on the basis of the reception power result report from the user terminal. However, the user terminal may compare the reception quality and the modified reception quality from multiple radio base stations, and may report a signal indicating the best reception quality or the radio base station corresponding to the best reception quality to the desired radio base station. The access point selector 138 of the macro base station 100 and the access point selectors 238 of the pico base stations 200 may select the radio base station corresponding to the best reception quality as the radio base station to which the user terminal should be connected on the basis of the report from the user terminal.

Modification 12

In the first and fourth embodiments, the terminal capability determiner 232 of the pico base station 200 determines whether a user terminal is the IRC terminal 300 or the non-IRC terminal 400 based on the terminal capability information UC reported from the user terminal connected with the pico base station 200. However, the pico base station 200 may forward multiple pieces of terminal capability information UC to the macro base station 100, and the terminal capability determiner 132 of the macro base station 100 may determine whether a user terminal is the IRC terminal 300 or the non-IRC terminal 400 based on the forwarded terminal capability information UC.

Modification 13

In the above-described embodiments, the pico base stations 200 are used as examples of base stations having a lower transmission capability than the macro base station 100. A micro base station, a nano base station, a femto base station, or the like may be used as a base station having a lower transmission capability. In particular, the radio network may be constituted of a combination of a plurality of types of base stations having different transmission capabilities (for example, a combination of macro base stations, pico base stations, and femto base stations). In the above-described embodiments, pico base stations 200 are used as low-power radio base stations, and the pico base station 200 selects the radio base station to which a mobile terminal 300 should be connected on the basis of reception quality information received from the mobile terminal 300 connected to the pico base station 200. However, the low-power radio base station may be a remote radio head that transfers the reception quality information received from the mobile terminal 300 to the macro base station, in which the macro base station selects the radio base station to which the mobile terminal 300 should be connected.

Modification 14

The user terminals (IRC terminals 300 and non-IRC terminals 400) may be any type of device that can perform radio communication with each of the radio base stations. The user terminal 300 may be a cell phone terminal, e.g., a feature phone or a smart phone, a desk-top type personal computer, a laptop personal computer, a UMPC (ultra-mobile personal computer), a portable game machine, or another type of radio terminal.

Modification 15

In each of elements in the radio communication system (the macro base station 100, the pico base stations 200, and the user terminals), functions executed by the CPU may be executed by hardware or a programmable logic device, such as an FPGA (Field Programmable Gate Array) or a DSP (Digital Signal Processor), instead of the CPU.

The above-described embodiments and modifications may be combined as long as there is no conflict.

REFERENCE SYMBOLS

Cm: macro cell (first cell)
Cp: pico cell (second cell)
100: macro base station (high-power radio base station)
110: radio communicator
112: transceiving antenna
114: amplifier
120: inter-base station communicator
130: controller
132: terminal capability determiner
134: transmission power controller
138: access point selector 140: cell range expansion (CRE) offset value controller
200: pico base station (low-power radio base station)
210: radio communicator
212: transceiving antenna
214: amplifier
220: inter-base station communicator
230: controller
232: terminal capability determiner
240: cell range expansion (CRE) offset value controller
300: IRC terminal (user terminal)
310: radio communicator
312: transceiving antennas
330: controller
332: terminal capability information transmitter
334: reception quality measurer
336: reception quality modifier
338: reception quality reporter
340: connection executor
342: IRC executor
400: non-IRC terminal (user terminal)
410: radio communicator
412: transceiving antenna
430: controller
432: terminal capability information transmitter
434: reception quality measurer
436: reception quality modifier
438: reception quality reporter
440: connection executor

The invention claimed is:

1. A radio communication system comprising:
at least one high-power radio base station that forms a first cell and communicates with multiple user terminals; and
at least one low-power radio base station connected with the high-power radio base station and communicates with multiple user terminals, the low-power radio base station having a maximum transmission power less than a maximum transmission power of the high-power radio base station and forming a second cell within the first cell, the second cell being smaller than the first cell,
the high-power radio base station being configured to execute wireless transmission to the user terminals using resources that are the same as resources used by the low-power radio base station, and being configured to collaborate with the low-power radio base station for inter-cell interference control,
the high-power radio base station comprising:
a radio communicator configured to execute wireless communication with user terminals connected with the high-power radio base station; and
a transmission power controller configured to control downlink transmission power used by the radio communicator for transmission to the user terminals; wherein
the transmission power controller is configured to cause the radio communicator to operate at a first downlink transmission power at first resources among said resources, and to cause the radio communicator to operate at a second downlink transmission power that is lower than the first downlink transmission power at second resources among said resources, and wherein
the transmission power controller is configured to adjust the second downlink transmission power in accordance with
a proportion of the number of user terminals capable of executing interference rejection combining from among the total number of user terminals connected with at least one of the high-power radio base station and the low-power radio base station,
a proportion of the downlink traffic amount for user terminals capable of executing interference rejection combining from among the total downlink traffic amount for user terminals connected with at least one of the high-power radio base station and the low-power radio base station, or
the number of downlink resource blocks allocated to user terminals connected with at least one of the high-power radio base station and the low-power radio base station and being capable of executing interference rejection combining.

2. The radio communication system according to claim 1, wherein the transmission power controller of the high-power radio base station is configured to adjust the second downlink transmission power in accordance with a proportion of the number of user terminals capable of executing interference rejection combining from among the total number of user terminals connected with the low-power radio base station.

3. The radio communication system according to claim 1, wherein the transmission power controller of the high-power radio base station is configured to adjust the second downlink transmission power in accordance with a proportion of the downlink traffic amount for user terminals capable of executing interference rejection combining from among the total downlink traffic amount for user terminals connected with the low-power radio base station.

4. The radio communication system according to claim 1, wherein the transmission power controller of the high-power radio base station is configured to adjust the second downlink transmission power in accordance with the number of downlink resource blocks allocated to user terminals connected with the low-power radio base station and being capable of executing interference rejection combining.

5. The radio communication system according to claim 2, wherein the transmission power controller of the high-power radio base station is configured to adjust the second downlink transmission power taking account of respective levels of interference rejection combining capability of the user terminals connected with the low-power radio base station and being capable of executing interference rejection combining.

6. The radio communication system according to claim 1, wherein the transmission power controller of the high-power radio base station is configured to adjust the second downlink transmission power in accordance with a proportion of the number of user terminals capable of executing interference rejection combining from among the total number of user terminals connected with the high-power radio base station.

7. The radio communication system according to claim 1, wherein the transmission power controller of the high-power radio base station is configured to adjust the second downlink transmission power in accordance with a proportion of the downlink traffic amount for user terminals capable of executing interference rejection combining from among the total downlink traffic amount for user terminals connected with the high-power radio base station.

8. The radio communication system according to claim 1, wherein the transmission power controller of the high-power radio base station is configured to adjust the second downlink transmission power in accordance with the number of downlink resource blocks allocated to user terminals connected with the high-power radio base station and being capable of executing interference rejection combining.

9. The radio communication system according to claim 6, wherein the transmission power controller of the high-power radio base station is configured to adjust the second downlink transmission power taking account of respective levels of interference rejection combining capability of the user terminals connected with the high-power radio base station and being capable of executing interference rejection combining.

10. The radio communication system according to claim 1, wherein the high-power radio base station or the low-power radio base station comprises a cell range expansion offset value controller configured to control, on the basis of respective levels of interference rejection combining capability of the user terminals, offset values used by the respective user terminals for modifying reception quality or reception power from the low-power radio base station for cell range expansion, wherein the cell range expansion offset value controller is configured to control the offset values in such a manner that the lower the level of interference rejection combining capability of the user terminal, the lower the degree of enhancement for the reception quality or reception power from the low-power radio base station by the offset value.

11. A radio base station communicating with user terminals and being configured to execute wireless transmission to the user terminals using resources that are the same as resources used by a low-power radio base station having a maximum transmission power less than a maximum transmission power of the radio base station and forming a second cell within a first cell formed by the radio base station, the radio base station being configured to collaborate with the low-power radio base station for inter-cell interference control, the radio base station comprising:

a radio communicator configured to execute wireless communication with user terminals connected with the radio base station; and a transmission power controller configured to control downlink transmission power used by the radio communicator for transmission to the user terminals; wherein the transmission power controller is configured to cause the radio communicator to operate at a first downlink transmission power at first resources among said resources, and to cause the radio communicator to operate at a second downlink transmission power that is lower than the first downlink transmission power at second resources among said resources, and wherein the transmission power controller is configured to adjust the second downlink transmission power in accordance with a proportion of the number of user terminals capable of executing interference rejection combining from among the total number of user terminals connected with at least one of the radio base station and the low-power radio base station, a proportion of the downlink traffic amount for user terminals capable of executing interference rejection combining from among the total downlink traffic amount for user terminals connected with at least one of the radio base station and the low-power radio base station, or the number of downlink resource blocks allocated to user terminals connected with at least one of the radio base station and the low-power radio base station and being capable of executing interference rejection combining.

\* \* \* \* \*